(12) United States Patent
Wakabayashi et al.

(10) Patent No.: US 9,783,878 B2
(45) Date of Patent: Oct. 10, 2017

(54) HIGH-STRENGTH HOT-DIP GALVANIZED STEEL SHEET AND HIGH-STRENGTH ALLOYED HOT-DIP GALVANIZED STEEL SHEET HAVING EXCELLENT PLATING ADHESION, FORMABILITY, AND HOLE EXPANDABILITY WITH TENSILE STRENGTH OF 980 MPA OR MORE AND MANUFACTURING METHOD THEREFOR

(71) Applicant: Nippon Steel & Sumitomo Metal Corporation, Tokyo (JP)

(72) Inventors: Chisato Wakabayashi, Tokyo (JP); Masafumi Azuma, Tokyo (JP); Nobuhiro Fujita, Tokyo (JP); Kohichi Sano, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 568 days.

(21) Appl. No.: 14/347,289

(22) PCT Filed: Sep. 28, 2012

(86) PCT No.: PCT/JP2012/075230
§ 371 (c)(1),
(2) Date: Mar. 26, 2014

(87) PCT Pub. No.: WO2013/047830
PCT Pub. Date: Apr. 4, 2013

(65) Prior Publication Data
US 2014/0342183 A1   Nov. 20, 2014

(30) Foreign Application Priority Data
Sep. 30, 2011   (JP) ................. 2011-216967

(51) Int. Cl.
| | | |
|---|---|---|
| *C23C 2/06* | (2006.01) | |
| *C23C 2/02* | (2006.01) | |
| *C23C 2/28* | (2006.01) | |
| *C22C 18/00* | (2006.01) | |
| *B32B 15/01* | (2006.01) | |
| *C22C 38/00* | (2006.01) | |
| *C22C 38/02* | (2006.01) | |
| *C22C 38/04* | (2006.01) | |
| *C22C 38/06* | (2006.01) | |
| *C21D 8/04* | (2006.01) | |
| *C21D 9/48* | (2006.01) | |

(Continued)

(52) U.S. Cl.
CPC .............. *C23C 2/06* (2013.01); *B32B 15/013* (2013.01); *C21D 8/0426* (2013.01); *C21D 8/0436* (2013.01); *C21D 8/0473* (2013.01); *C21D 8/0478* (2013.01); *C21D 9/48* (2013.01); *C22C 18/00* (2013.01); *C22C 18/04* (2013.01); *C22C 38/001* (2013.01); *C22C 38/002* (2013.01); *C22C 38/005* (2013.01); *C22C 38/02* (2013.01); *C22C 38/04* (2013.01); *C22C 38/06* (2013.01); *C22C 38/12* (2013.01); *C22C 38/14* (2013.01); *C22C 38/34* (2013.01); *C22C 38/38* (2013.01); *C23C 2/02* (2013.01); *C23C 2/28* (2013.01); *C21D 8/0263* (2013.01); *C21D 2211/002* (2013.01); *C21D 2211/005* (2013.01); *C21D 2211/008* (2013.01); *C21D 2211/009* (2013.01); *Y10T 428/12799* (2015.01)

(58) Field of Classification Search
CPC ........ C21D 2211/00; C23C 2/00; C22C 18/00
USPC ........................................... 148/533
See application file for complete search history.

(56) References Cited

U.S. PATENT DOCUMENTS

| | | | |
|---|---|---|---|
| 8,076,008 B2 * | 12/2011 | Kaneko .............. | C22C 38/001 428/659 |
| 2008/0000555 A1 * | 1/2008 | Nonaka ............... | B21B 3/02 148/328 |
| 2012/0222781 A1 | 9/2012 | Azuma et al. | |

FOREIGN PATENT DOCUMENTS

| | | |
|---|---|---|
| CA | 2781815 | 6/2011 |
| JP | 61-217529 | 9/1986 |

(Continued)

OTHER PUBLICATIONS

International Search Report dated Dec. 25, 2012 issued in corresponding PCT Application No. PCT/JP2012/075230 [with English Translation].

(Continued)

*Primary Examiner* — Jie Yang
(74) *Attorney, Agent, or Firm* — Birch, Stewart, Kolasch & Birch, LLP

(57) ABSTRACT

Provided is a high-strength hot-dip galvanized steel sheet having excellent plating adhesion, formability, and hole expandability with an ultimate tensile strength of 980 MPa or more, the hot-dip galvanized steel sheet comprising a hot-dip galvanized layer formed on a surface of a base steel sheet. The base steel sheet contains, by mass %, C: 0.05% to 0.4 %; Si: 0.01% to 3.0%; Mn: 0.1% to 3.0%; Al: 0.01 to 2.0%; in which Si+Al >0.5%, P: limited to 0.04% or less; S: limited to 0.05% or less; N: limited to 0.01% or less; and a balance including Fe and inevitable impurities, a microstructure of the base steel sheet contains 40% or more by total volume fraction of martensite and bainite, 8% or more by volume fraction of residual austenite, and a balance of the microstructure being ferrite or ferrite and 10% or less by volume fraction of pearlite. The martensite contains 10% or more by total volume fraction of two or more kinds of three kinds of martensites (1), (2), and (3), and the hot-dip galvanized layer contains less than 7 mass % of Fe.

8 Claims, No Drawings

(51) Int. Cl.
  *C22C 38/12*   (2006.01)
  *C22C 38/14*   (2006.01)
  *C22C 38/34*   (2006.01)
  *C22C 38/38*   (2006.01)
  *C22C 18/04*   (2006.01)
  *C21D 8/02*    (2006.01)

(56) References Cited

FOREIGN PATENT DOCUMENTS

| | | |
|---|---|---|
| JP | 5-59429 | 3/1993 |
| JP | 2526320 | 6/1996 |
| JP | 2526322 | 6/1996 |
| JP | 2005-105367 | 4/2005 |
| JP | 2006-283071 | 10/2006 |
| JP | 2009-242816 | 10/2009 |
| JP | 2010-65272 | 3/2010 |
| JP | 2010-209428 | 9/2010 |
| JP | 2011-111673 | 6/2011 |
| JP | 2011-168816 | 9/2011 |
| WO | WO 2010/103936 | 9/2010 |
| WO | WO 2011/065591 | 6/2011 |

OTHER PUBLICATIONS

Canadian Office Action dated Jul. 7, 2015 issued in corresponding Canadian Application No. 2,850,101.
Korean Office Action dated Aug. 11, 2015 issued in corresponding Korean Application No. 2014-7010908 [English language translation included].

\* cited by examiner

HIGH-STRENGTH HOT-DIP GALVANIZED STEEL SHEET AND HIGH-STRENGTH ALLOYED HOT-DIP GALVANIZED STEEL SHEET HAVING EXCELLENT PLATING ADHESION, FORMABILITY, AND HOLE EXPANDABILITY WITH TENSILE STRENGTH OF 980 MPA OR MORE AND MANUFACTURING METHOD THEREFOR

TECHNICAL FIELD

The present invention relates to a high-tensile steel sheet having excellent formability (ductility and hole expandability) and to an alloyed hot-dip galvanized steel sheet using TRIP (Transformation Induced Plasticity) phenomenon and a manufacturing method thereof.

This application is a national stage application of International Application No. PCT/JP012/075230, filed Sep. 28, 2012, which claims priority to Japanese Patent Application No. 2011-216967, filed on Sep. 30, 2011, the content of which is incorporated herein by reference.

BACKGROUND ART

High strengthening of a steel sheet which is a raw material has been in progress so as to realize both of compatibility between a weight saving of a body, components, and the like of a vehicle, and safety. Generally, when the strength of the steel sheet increases, formability (ductility and hole expandability) is damaged. Therefore, the balance of strength and formability is necessary in order to use the high-strength steel sheet for the members of the vehicles. For this requirement, hitherto, a so-called TRIP steel sheet using transformation induced plasticity of residual austenite has been suggested (for example, refer to Patent Literature 1 and Patent Literature 2). The high strength steel sheet for the vehicle requires corrosion resistance depending on components to be applied. An alloyed hot-dip galvanized steel sheet is applied to such a case. However, Si is added to the TRIP steel to improve the ductility. When the Si concentrated on the surface of the steel sheet oxidizes, the TRIP steel has a problem in that galvanizing faults easily occur at the time of hot-dip galvanizing.

A manufacturing method of a high-strength alloyed hot-dip galvanized steel sheet has been disclosed in Patent Literatures 3 and 4 which can achieve wettability improvement of plating and reduction of alloying temperature by performing Ni pre-plating on an Si-added high strength steel sheet and working a surface layer to activate. In this method, a hot-dip galvanized steel sheet and an alloyed hot-dip galvanized steel sheet can be manufactured by re-heating and plating a cold-rolled steel sheet, in which a material as an original sheet is previously integrated, produced by a cold rolling-annealing process.

In addition, a technique has been proposed in Patent Literature 5 which produces a high elongation-type alloyed hot-dip galvanized steel sheet by utilizing a Ni pre-plating technique. This method relates to manufacturing a high-strength steel sheet having excellent corrosion resistance by making steel consisting of ferrite and martensite by controlling steel components, annealing conditions, alloying hot-dip galvanizing conditions or the like and then performing hot-dip galvanizing.

However, in the hot-dip galvanized steel sheet and the alloyed hot-dip galvanized steel sheet, the martensite, which is once generated, is softened when the steel sheet is re-heated in the galvanizing process, and thus a desired strength cannot be obtained. In this way, it is difficult to achieve both of high strengthening and formability, and a hot-dip galvanized steel sheet and an alloyed hot-dip galvanized steel sheet having good corrosion resistance with high tensile strength of 980 MPa or more and excellent formability have been desired.

PRIOR ART LITERATURE(S)

Patent Literature(s)

[Patent Literature 1] JP 61-217529A
[Patent Literature 2] JP 5-59429A
[Patent Literature 3] JP 2526320B
[Patent Literature 4] JP 2526322B
[Patent Literature 5] JP 2006-283071A

SUMMARY OF THE INVENTION

Problem(s) to be Solved by the Invention

The present invention is to solve the above-described problems and to provide a high-strength hot-dip galvanized steel sheet and an alloyed hot-dip galvanized steel sheet having excellent ductility and hole expandability by combining a rolling process with heat treatment in a hot-dip galvanizing line.

Means for Solving the Problem(s)

The present inventors examined in detail on a structure control due to heat treatment and effects of working and heat treatment with respect to various steels in which contents of C, Si, and Mn are varied. As a result, the present inventors have found that a steel sheet having unique structures can be obtained by working and heat treatment using heat treatment in continuous annealing, rolling working, and heat treatment during subsequent plating treatment. In addition, the inventors have found that the steel sheet can have ultimate tensile strength of 980 MPa or more which has been a problem until now, excellent formability (ductility and hole expandability), and plating property.

The gist of the present invention are as follows.

[1] A high-strength hot-dip galvanized steel sheet having excellent plating adhesion, formability, and hole expandability with an ultimate tensile strength of 980 MPa or more, the hot-dip galvanized steel sheet comprising a hot-dip galvanized layer formed on a surface of a base steel sheet,
wherein the base steel sheet contains: by mass %,
C: 0.05% to 0.4%;
Si: 0.01% to 3.0%;
Mn: 0.1% to 3.0%;
Al: 0.01 to 2.0%; in which Si+Al>0.5%
P: limited to 0.04% or less;
S: limited to 0.05% or less;
N: limited to 0.01% or less; and
a balance including Fe and inevitable impurities,
a microstructure of the base steel sheet contains 40% or more by total volume fraction of martensite and bainite, 8% or more by volume fraction of residual austenite, and a balance of the microstructure being ferrite or ferrite and 10% or less by volume fraction of pearlite,
the martensite contains 10% or more by total volume fraction of two or more kinds of three kinds of martensites (1), (2), and (3) below, and
the hot-dip galvanized layer contains less than 7 mass % of Fe, the martensite (1): C concentration (when there is a cementite precipitation, also including C in cementite); CM1 is less than 0.8 mass %, and nano-indentation test hardness Hit1 satisfies Expression 1.

$$Hit1/\{-982.1 \times (CM1)^2 + 1676 \times CM1 + 189\} \leq 0.50 \quad \text{Expression 1}$$

the martensite (2): C concentration (when there is a cementite precipitation, also including C in cementite); CM2 is 0.8 mass % or more, and nano-indentation test hardness Hit2 satisfies Expression 2.

$$Hit2/\{-982.1 \times (CM2)^2 + 1676 \times CM2 + 189\} \leq 0.50 \quad \text{Expression 2}$$

the martensite (3): C concentration (when there is a cementite precipitation, also including C in cementite); CM3 is 0.8 mass % or more, and nano-indentation test hardness Hit3 satisfies Expression 3.

$$0.5 < Hit3/\{-982.1 \times (CM3)^2 + 1676 \times CM3 + 189\} \leq 0.80 \quad \text{Expression 3}$$

[2] The high-strength hot-dip galvanized steel sheet having the excellent plating adhesion, formability, and hole expandability with the ultimate tensile strength of 980 MPa or more according to [1], wherein the base steel sheet further contains one or two or more of: by mass %,
  Cr: 0.05 to 1.0%;
  Mo: 0.05 to 1.0%;
  Ni: 0.05 to 1.0%; and
  Cu: 0.05 to 1.0%.

[3] The high-strength hot-dip galvanized steel sheet having the excellent plating adhesion, formability, and hole expandability with the ultimate tensile strength of 980 MPa or more according to [1], wherein the base steel sheet further contains one or two or more of: by mass %,
  Nb: 0.005 to 0.3%;
  Ti: 0.005 to 0.3%; and
  V: 0.01 to 0.5%.

[4] The high-strength hot-dip galvanized steel sheet having the excellent plating adhesion, formability, and hole expandability with the ultimate tensile strength of 980 MPa or more according to [1], wherein the base steel sheet further contains B: 0.0001 to 0.1% by mass %.

[5] The high-strength hot-dip galvanized steel sheet having the excellent plating adhesion, formability, and hole expandability with the ultimate tensile strength of 980 MPa or more according to [1], wherein the base steel sheet further contains one or two or more of: by mass %,
  Ca: 0.0005 to 0.01%;
  Mg: 0.0005 to 0.01%; and
  REM: 0.0005 to 0.01%.

[6] A high-strength alloyed hot-dip galvanized steel sheet having excellent plating adhesion, formability, and hole expandability with an ultimate tensile strength of 980 MPa or more, the alloyed hot-dip galvanized steel sheet comprising an alloyed hot-dip galvanized layer formed on a surface of a base steel sheet,
  wherein the base steel sheet contains: by mass %,
  C: 0.05% to 0.4%;
  Si: 0.01% to 3.0%;
  Mn: 0.1% to 3.0%;
  Al: 0.01 to 2.0%; in which Si+Al>0.5%
  P: limited to 0.04% or less;
  S: limited to 0.05% or less;
  N: limited to 0.01% or less; and
  a balance including Fe and inevitable impurities,
  a microstructure of the base steel sheet contains 40% or more by total volume fraction of martensite and bainite, 8% or more by volume fraction of residual austenite, and a balance of the microstructure being ferrite or ferrite and 10% or less by volume fraction of pearlite,
  the martensite contains 10% or more by total volume fraction of two or more kinds of three kinds of martensites (1), (2), and (3) below, and
  the alloyed hot-dip galvanized layer contains 7 to 15 mass % of Fe,
  the martensite (1): C concentration (when there is a cementite precipitation, also including C in cementite); CM1 is less than 0.8 mass %, and nano-indentation test hardness Hit1 satisfies Expression 1.

$$Hit1/\{-982.1 \times (CM1)^2 + 1676 \times CM1 + 189\} \leq 0.50 \quad \text{Expression 1}$$

the martensite (2): C concentration (when there is a cementite precipitation, also including C in cementite); CM2 is 0.8 mass % or more, and nano-indentation test hardness Hit2 satisfies Expression 2.

$$Hit2/\{-982.1 \times (CM2)^2 + 1676 \times CM2 + 189\} \leq 0.50 \quad \text{Expression 2}$$

the martensite (3): C concentration (when there is a cementite precipitation, also including C in cementite); CM3 is 0.8 mass % or more, and nano-indentation test hardness Hit3 satisfies Expression 3.

$$0.5 < Hit3/\{-982.1 \times (CM3)^2 + 1676 \times CM3 + 189\} \leq 0.80 \quad \text{Expression 3}$$

[7] The high-strength alloyed hot-dip galvanized steel sheet having the excellent plating adhesion, formability, and hole expandability with the ultimate tensile strength of 980 MPa or more according to [6], wherein the base steel sheet further contains one or two or more of: by mass %,
  Cr: 0.05 to 1.0%;
  Mo: 0.05 to 1.0%;
  Ni: 0.05 to 1.0%; and
  Cu: 0.05 to 1.0%.

[8] The high-strength alloyed hot-dip galvanized steel sheet having the excellent plating adhesion, formability, and hole expandability with the ultimate tensile strength of 980 MPa or more according to [6], wherein the base steel sheet further contains one or two or more of: by mass %,
  Nb: 0.005 to 0.3%;
  Ti: 0.005 to 0.3%; and
  V: 0.01 to 0.5%.

[9] The high-strength alloyed hot-dip galvanized steel sheet having the excellent plating adhesion, formability, and hole expandability with the ultimate tensile strength of 980 MPa or more according to [6], wherein the base steel sheet further contains B: 0.0001 to 0.1% by mass %.

[10] The high-strength alloyed hot-dip galvanized steel sheet having the excellent plating adhesion, formability, and hole expandability with the ultimate tensile strength of 980 MPa or more according to [6], wherein the base steel sheet further contains one or two or more of: by mass %,
  Ca: 0.0005 to 0.01%;
  Mg: 0.0005 to 0.01%; and
  REM: 0.0005 to 0.01%.

[11] A manufacturing method of a high-strength hot-dip galvanized steel sheet having excellent plating adhesion, formability, and hole expandability with an ultimate tensile strength of 980 MPa or more, the manufacturing method comprising:
  with respect to a steel billet containing: by mass %,
  C: 0.05% to 0.4%;
  Si: 0.01% to 3.0%;
  Mn: 0.1% to 3.0%;
  Al: 0.01 to 2.0%; in which Si+Al>0.5%
  P: limited to 0.04% or less;

S: limited to 0.05% or less;

N: limited to 0.01% or less; and a balance including Fe and inevitable impurities, heating to 1200° C. or higher and performing hot rolling at an Ar3 transformation temperature or higher;

performing cold rolling on a base steel sheet after the hot rolling at a reduction ratio of 40 to 70%;

annealing the base steel sheet after the cold rolling at 730 to 900° C.;

cooling the base steel sheet after the annealing to a temperature of 650 to 750° C. at an average cooling rate of 0.1 to 200° C./second, and cooling the base steel sheet to 450° C. or lower from the temperature of 650 to 750° C. at an average cooling rate of 20° C./second or faster;

holding the base steel sheet cooled to the 450° C. or lower in a range of 350 to 450° C. for 120 seconds or longer;

cooling the base steel sheet held in the range of 350 to 450° C. to 70° C. or lower at an average cooling rate of 5° C./second or faster;

rolling the base steel sheet cooled to the room temperature at an elongation percentage of 0.2 to 2%;

heating the rolled base steel sheet to "temperature of hot-dip galvanizing bath −40"° C. to "temperature of hot-dip galvanizing bath +50"° C. at an average temperature rising rate of 10° C./second or faster;

dipping and hot-dip galvanizing the base steel sheet heated to the "temperature of hot-dip galvanizing bath −40"° C. to "temperature of hot-dip galvanizing bath +50"° C. into a hot-dip galvanizing bath; and cooling the hot-dip galvanized steel sheet, which is hot-dip galvanized, to 70° C. or lower at an average cooling rate of 5° C./second or faster.

[12] The manufacturing method of the high-strength hot-dip galvanized steel sheet having the excellent plating adhesion, formability, and hole expandability with the ultimate tensile strength of 980 MPa or more according to [11], wherein a hot-dip galvanizing bath flows at a flow rate of 10 m/min or more and 50 m/min or less at the time of the hot-dip galvanizing.

[13] The manufacturing method of the high-strength hot-dip galvanized steel sheet having the excellent plating adhesion, formability, and hole expandability with the ultimate tensile strength of 980 MPa or more according to [11], wherein before being heated to the "temperature of hot-dip galvanizing bath −40"° C. to "temperature of hot-dip galvanizing bath +50"° C., the base steel sheet is subjected to pickling, and then a surface of the base steel sheet is polished and removed to a depth of 0.1 μm or more and is pre-plated with 0.2 to 2 g/m² of Ni.

[14] A manufacturing method of a high-strength alloyed hot-dip galvanized steel sheet having excellent plating adhesion, formability, and hole expandability with an ultimate tensile strength of 980 MPa or more, the manufacturing method comprising:

with respect to a steel billet containing: by mass %,

C: 0.05% to 0.4%;

Si: 0.01% to 3.0%;

Mn: 0.1% to 3.0%;

Al: 0.01 to 2.0%; in which Si+Al>0.5%

P: limited to 0.04% or less;

S: limited to 0.05% or less;

N: limited to 0.01% or less; and a balance including Fe and inevitable impurities, heating to 1200° C. or higher and performing hot rolling at an Ar3 transformation temperature or higher;

performing cold rolling on a base steel sheet after the hot rolling at a reduction ratio of 40 to 70%;

annealing the base steel sheet after the cold rolling at 730 to 900° C.;

cooling the base steel sheet after the annealing to a temperature of 650 to 750° C. at an average cooling rate of 0.1 to 200° C./second, and cooling the base steel sheet to 450° C. or lower from the temperature of 650 to 750° C. at an average cooling rate of 20° C./second or faster;

holding the base steel sheet cooled to the 450° C. or lower in a range of 350 to 450° C. for 120 seconds or longer;

cooling the base steel sheet held in the range of 350 to 450° C. to 70° C. or lower at an average cooling rate of 5° C./second or faster;

rolling the base steel sheet cooled to the room temperature at an elongation percentage of 0.2 to 2%;

heating the rolled base steel sheet to "temperature of hot-dip galvanizing bath −40"° C. to "temperature of hot-dip galvanizing bath +50"° C. at an average temperature rising rate of 10° C./second or faster;

dipping and hot-dip galvanizing the base steel sheet heated to the "temperature of hot-dip galvanizing bath −40"° C. to "temperature of hot-dip galvanizing bath +50"° C. into a hot-dip galvanizing bath and performing alloying-heating treatment at "temperature of hot-dip galvanizing bath −40"° C. or higher and 560° C. or lower within 40 seconds; and cooling the alloyed hot-dip galvanized steel sheet, which is subjected to the alloying-heating treatment, to 70° C. or lower at an average cooling rate of 5° C./second or faster.

[15] The manufacturing method of the high-strength alloyed hot-dip galvanized steel sheet having the excellent plating adhesion, formability, and hole expandability with the ultimate tensile strength of 980 MPa or more according to [14], wherein a hot-dip galvanizing bath flows at a flow rate of 10 m/min or more and 50 m/min or less at the time of the hot-dip galvanizing.

[16] The manufacturing method of the high-strength alloyed hot-dip galvanized steel sheet having the excellent plating adhesion, formability, and hole expandability with the ultimate tensile strength of 980 MPa or more according to [14], wherein before being heated to the "temperature of hot-dip galvanizing bath −40"° C. to "temperature of hot-dip galvanizing bath +50"° C., the base steel sheet is subjected to pickling, and then a surface of the base steel sheet is polished and removed to a depth of 0.1 μm or more and is pre-plated with 0.2 to 2 g/m² of Ni.

Effect(s) of the Invention

According to the present invention, it is possible to obtain a hot-dip galvanized steel sheet and an alloyed hot-dip galvanized steel sheet having excellent formability with high strength and to remarkably contribute to the industry.

MODE(S) FOR CARRYING OUT THE INVENTION

The present invention will be described below in detail.

(Microstructure of Base Steel Sheet)

First, microstructures of a base steel sheet according to the present invention will be described. The microstructures of the base steel sheet according to the present invention include bainite, martensite, and a residual austenite. Further, the martensite includes two or more kinds of three kinds of martensites (1), (2), and (3) defined below.

Martensite (1): C concentration (when there is a cementite precipitation, also including C in cementite). CM1 is less than 0.8 mass % and nano-indentation test hardness Hit1 satisfies Expression 1.

$$Hit1/\{-982.1 \times (CM1)^2 + 1676 \times CM1 + 189\} \leq 0.50 \quad \text{Expression 1}$$

Martensite (2): C concentration (when there is a cementite precipitation, also including C in cementite). CM2 is 0.8 mass % or more and nano-indentation test hardness Hit2 satisfies Expression 2.

$$\text{Hit2}/\{-982.1 \times (\text{CM2})^2 + 1676 \times \text{CM2} + 189\} \leq 0.50 \quad \text{Expression 2}$$

Martensite (3): C concentration (when there is a cementite precipitation, also including C in cementite). CM3 is 0.8 mass % or more and nano-indentation test hardness Hit3 satisfies Expression 3.

$$0.5 < \text{Hit3}/\{-982.1 \times (\text{CM3})^2 + 1676 \times \text{CM3} + 189\} \leq 0.80 \quad \text{Expression 3}$$

Although the detailed reason is unclear, when two or more kinds of martensites among these three kinds of martensites (1) to (3) are contained 10% or more by total volume fraction, both of strength and hole expandability are achieved. The martensite, which has the hardest structure of structures contained in the base steel sheet of the present invention, is essential to ensure ultimate tensile strength of 980 MPa or more. On the other hand, in a hole expanding test and a bending test, since the martensite is a starting point of void formation, it is known that the martensite deteriorates hole expandability. Therefore, in order to ensure the hole expandability, deformation is prevented from concentrating on a specific martensite grain by mixing two or more kinds of martensites among these three different kinds of martensites. As a result, a technique that does not deteriorate the hole expandability while contributing to higher strengthening has been found. This effect can be obtained when the total volume fraction of the two or more martensites among the three kinds of martensites is set to be 10% or more. From this reason, the lower limit of the volume fraction of the three kinds of martensites (1) to (3) was set to be 10%. Preferably, the lower limit is 15% or more.

The martensite (1) is a tempered martensite, which is low in C concentration and is not so hard. The C concentration CM1 of the martensite (1) is less than 0.8 mass %. When there is a cementite precipitation in the martensite (1), C in cementite which is precipitated in the martensite (1) is also contained. The cementite in the martensite mentioned herein may be either of a precipitation in or between martensite laths, so that the effect of the present invention is exhibited. This structure originates from a fresh martensite to be formed at the time of cooling to 70° C. or lower after being held at 350 to 450° C. in an annealing process of the manufacturing method of the present invention. The martensite (1) is a tempered martensite in which the fresh martensite formed at the time of cooling to 70° C. or lower after being held at 350 to 450° C. is tempered during dipping treatment into a hot-dip galvanizing bath or alloying treatment.

The C concentration CM1 of the martensite (1) is less than 0.8 mass %. This also includes a case in which C concentration was reduced to less than 0.8 mass % when C in the fresh martensite was diffused into austenite during the dipping treatment into the hot-dip galvanizing bath or the alloying treatment and thus the fresh martensite was tempered even though C concentration of the fresh martensite was 0.8 mass % or more, in addition to a case in which C concentration of the fresh martensite formed at the time of cooling to 70° C. or lower after being held at 350 to 450° C. was less than 0.8 mass %.

Since the martensite (1) has the C concentration CM1 as low as less than 0.8 mass % and is tempered, it is the softest among three kinds of martensites (1) to (3). Nano-indentation test hardness Hit1 of the martensite (1) satisfies Expression 1. When the volume fraction of the martensite (1) is 60% or more of a microstructure of the base steel sheet, a volume fraction of ferrite and residual austenite becomes too low, and the ductility deteriorates, so that the upper limit is preferably 60%.

The martensite (2) has a high C concentration, but is martensite which is softened by tempering. C concentration CM2 of the martensite (2) is 0.8 mass % or more. When there is a cementite precipitation in the martensite (2), C in the cementite which is precipitated in the martensite (2) is also contained. Similarly, the cementite in the martensite may be either of precipitation in or between martensite laths. The martensite (2) originates from strain-induced transformation martensite which is induced by the rolling work and into which a part of a residual austenite is transformed. While the base steel sheet is held at a temperature range of 350 to 450° C. after annealing, bainite transformation of the microstructure in the base steel sheet proceeds and thus C is diffused into a non-transformed austenite. A residual austenite, in which C is concentrated, is formed in the base steel sheet which is cooled to 70° C. or lower. By strain-induced transformation of the residual austenite, in which C is concentrated, by rolling, martensite which is the origin of the martensite (2) can be obtained. The Martensite (2) is a tempered martensite in which the strain-induced transformation martensite generated by the rolling is tempered during the dipping treatment into the hot-dip galvanizing bath or the alloying treatment.

Like the martensite (1), the martensite (2) is a tempered martensite, but is harder than the martensite (1) since the C concentration is high. Nano-indentation test hardness Hit2 of the martensite (2) satisfies Expression 2. When a volume fraction of the martensite (2) is 40% or more of the microstructure of the base steel sheet, the ductility deteriorates, so that the upper limit is preferably set to be 60%.

The martensite (3) is martensite which is high in C concentration, is not tempered, or is low in a quantity of tempering. C concentration CM3 of the martensite (3) is 0.8 mass % or more. When there is a cementite precipitation in the martensite (3), C in the cementite which is precipitated in the martensite (3) is also contained. Similarly, the cementite in the martensite may be either of precipitation in or between martensite laths. The martensite (3) is a fresh martensite which is formed by transforming at the time of cooling to 70° C. or lower after the hot-dip galvanizing or the alloying-heating treatment. In addition, the martensite (3) is also martensite remaining in a state of fresh martensite without being tempered substantially during the alloying-heating treatment or the alloying treatment (not in a state of martensites (1) and (2)).

The martensite (3) is the hardest structure of three kinds of martensites (1) to (3). Nano-indentation test hardness Hit3 of the martensite (3) satisfies Expression 3. For this reason, the martensite (3) contributes to high strengthening, but deteriorates the hole expandability. Accordingly, in order to achieve both of the strength and formability, the upper limit of the martensite (3) is 10% in the volume fraction of the microstructure of the base steel sheet. However, when the volume fraction of the martensite (3) becomes too small, it is difficult to ensure strength which is ultimate tensile strength of 980 MPa or more, so that the lower limit is preferably set to be 3% or more.

Bainite is effective for ensuring the strength. When a high strength steel sheet having tensile strength exceeding 980 MPa contains martensite and bainite of 40% or more by total volume fraction, it is possible to ensure the strength and to obtain the high hole expandability. When the total volume fraction is less than 40%, the tensile strength is less than 980 MPa. Accordingly, the lower limit was set to be 40%.

The residual austenite is a structure to raise ductility, particularly uniformly elongation by transformation-induced plasticity. In order to obtain particularly good elongation, it is necessary to contain the residual austenite of 8% or more by volume fraction. Furthermore, due to transform into martensite by working, the residual austenite also contributes to obtaining of the high strengthening.

In the microstructure of the base steel sheet of the present invention, ferrite is not essential. However, since the ferrite causes the improvement of ductility, it may be contained. At the time of annealing, it is possible to control the volume fraction of ferrite by performing two-phase annealing. Furthermore, it is possible to control the volume fraction of ferrite by cooling after annealing. However, when the fraction of ferrite increases, the strength decreases. Although the high strengthening can be obtained by precipitation strengthening and solid solution strengthening, the volume fraction of ferrite is preferably 40% or less.

Pearlite may be contained as long as the volume fraction is 10% or less. When the volume fraction of pearlite exceeds 10%, the strength and ductility are reduced. Therefore, the upper limit was set to be 10%.

Furthermore, each phase of the microstructures such as martensite, bainite, austenite, pearlite, and ferrite can be identified and their locations and volume fraction can be observed and quantitatively measured using an optical microscope having a magnification of 1000 times and a scanning and transmission electron microscope having a magnification of 1000 times to 100000 times after a cross section of the steel sheet in a rolling direction or a cross section in the right angle direction of the rolling direction is etched using a Nital reagent and the reagent as disclosed in JP 59-219473A. The area fraction of each structure can be obtained by observing 20 or more fields and applying the point-count method or image analysis. Then, the obtained area fraction is defined as the volume fraction of each structure.

The classification method of three kinds of martensites (1) to (3) is hardness and C concentration. The hardness may be obtained by measuring nano-indentation testing hardness for three or more points in martensite grains and calculating an average hardness Hit. In the base steel sheet according to the present invention, since a large amount of additive elements are contained, a crystal grain diameter is small. Moreover, in the base steel sheet according to the present invention, there is a case in which an indentation size is greater than the grain diameter of martensite grains in measurement using a Vickers hardness test. Therefore, hardness measurement of a micro-region was performed by a nano-indenter. Samples cut out parallel to the rolling direction are embedded and then are subjected to mirror-polishing and electrolytic polishing. Then, the hardness measurement was performed on the polished samples. As test conditions, an indentation depth was measured under the condition of 50 nm using a Berkovich-type indenter. Furthermore, this test method is small in an indentation depth, and is sensitive to relation between the grain diameter of martensite and the indentation size, or surface irregularities. Therefore, as a preliminary test, the electrolytic polishing in various conditions and the hardness measurement in the condition with varying an indentation depth are performed, and conditions for obtaining a most reproducible good value was set as test conditions.

The C concentration of martensite grains may be measured by any measuring method which guarantees precision under the condition of obtaining an accurate decomposition concentration. For example, the C concentration of martensite grains can be obtained by carefully measuring the C concentration at a pitch of 0.5 µm or below using EPMA attached to FE-SEM. Therefore, martensites (1) to (3) are classified according to the hardness and the C concentration.

Furthermore, in order to distinguish these martensites (1) to (3), Expressions 1 to 3 use a relational expression between amounts of C CM1 to CM3 and nano-indentation test hardness Hit in each martensite. Denominators of the left sides of Expressions 1, 2, and 3, which are input values of C concentration represent hardness of carbides-free martensite (fresh martensite) of the C concentration. The hardness of the martensite contained in the base steel sheet of the present invention becomes lower than the hardness of a fresh martensite by precipitation of cementite at grains and tempering. Therefore, the classification is performed by taking a ratio between hardness of a fresh martensite of denominator and hardness of martensite of a steel sheet.

(Chemical Composition of Base Steel Sheet)

Next, a description of reasons for restricting the amounts of the compositions of the base steel sheet in the present invention will be described. Moreover, % in the composition represents % by mass.

C: C is added as an element which increases strength of steel and stabilizes a residual austenite to improve ductility. When the content is less than 0.05%, it is difficult to ensure tensile strength of 980 MPa or more. Ductility, weldability, and toughness are remarkably deteriorated by excessive addition exceeding 0.40%. Therefore, the content of C was set to be 0.05 to 0.1%. A more preferred range is 0.13% to 0.3%.

Si: Si is an element useful for increasing the strength of the steel sheet by solid-solution strengthening. In addition, Si is an essential element which has an effect for promoting concentration of C in austenite during bainite transformation and generates a residual austenite while annealing, in order to suppress the formation of cementite. These effects are not exhibited when the content is less than 0.01% and scale exfoliation and chemical convertibility generated in hot rolling are remarkably deteriorated by excessive addition exceeding 3.0%. Thus, the content of Si was set to be 0.01 to 3.0%.

Mn: Mn is an element effective for improving hardenability. An effect of increasing the hardenability is not sufficiently exhibited when the content is less than 0.1% and the toughness is deteriorated by excessive addition exceeding 3.0%. Accordingly, the content of Mn was set to be 0.1 to 3.0%.

Al: Al is an element having a function of deoxidizer. In addition, Al is a ferrite stabilizing element like Si and may be also used as an alternative of Si. Such an effect is not exhibited when the content is less than 0.01% and the toughness is deteriorated by excessive addition exceeding 2.0%. Therefore, the content of Al was set to be 0.01 to 2.0%.

Al+Si: Al and Si are elements having the same functions of ferrite stabilization and cementite suppression. Accordingly, a total additive amount of Al and Si is important. When the total additive amount is 0.5% or less, the function of stabilizing the ferrite and suppressing the cementite becomes weak. Therefore, the content was added with an amount larger than 0.5%.

P: P is an impurity element which segregates at grain boundaries to make grain boundary strength lower, thereby deteriorating the toughness. Thus, the content is preferably reduced. The upper limit of the content of P was limited to 0.04% in consideration of a current refining technology and manufacturing costs. The lower limit value of P is not particularly determined, but when the lower limit value is less than 0.0001%, it is disadvantageous economically, so this value is preferably set to the lower limit value.

S: S is an impurity element which deteriorates hot workability and toughness, and the content is preferably reduced. Accordingly, the upper limit was limited to 0.05%. The lower limit value of S is not particularly determined, but when the lower limit value is less than 0.0001%, it is disadvantageous economically, so this value is preferably set to the lower limit value.

N: N forms coarse nitrides to deteriorate bendability and hole expandability. Therefore, it is necessary to suppress the additive amount. The reason is because the tendency becomes remarkable when the content of N exceeds 0.01%. Thus, the content of N was in a range of 0.01% or less. In addition, this causes blowholes to occur at the time of welding, so the less the better. The effect of the present invention is exhibited without particularly determining the lower limit, but when the content of N is less than 0.0005%, the manufacturing cost dramatically increases, so this value is a substantial lower limit.

Further, one or two or more elements of Cr, Mo, Ni, and Cu may be added. These elements are elements effective for improving ductility and toughness. However, when the content of Cr, Mo, Ni, and Cu exceeds 1.0%, the toughness can be impaired due to an increase in strength. Accordingly, the upper limit of these elements was set to be 1.0%. Further, in order to improve the ductility and toughness, the necessary content of Cr is 0.05% or more, the necessary content of Mo is 0.05% or more, the necessary content of Ni is 0.05% or more, and the necessary content of Cu is 0.05% or more, so these values are set to the lower limit value, respectively.

Further, one or two or more elements of Ti, Nb, and V may be added. These elements are elements which form fine carbonitrides and are effective for suppressing coarsening of crystal grains, ensuring the strength, and improving the toughness. In order to ensure the strength and to improve the toughness, it is necessary to add 0.005% or more Ti and Nb and 0.01% or more V. However, when these elements are excessively added, a precipitate becomes coarse and the toughness may be deteriorated. Accordingly, the additive amount of Nb and Ti is preferably set to be 0.3% or less, and the additive amount of V is preferably set to be 0.5 or less.

B: B is an element which segregates at grain boundaries to suppress grain boundary segregation of P and S. In addition, this element is also effective for improving the hardenability. However, when the content of B exceeds 0.1%, a coarse precipitate occurs at the grain boundaries to impair the hot workability and the toughness. Accordingly, the content of B is set to be 0.1% or lower. Further, in order to enhance the ductility, toughness, and hot workability and to improve the hardenability by the strengthening of the grain boundaries, the addition of B is preferably 0.0001% or more.

Further, one or two or more elements of Ca, Mg, and REM may be added. These elements are elements effective for controlling sulfide forms to suppress the deterioration of the hot workability and toughness due to S. REM indicates a rare earth metal. However, even when these elements are excessively added, since the effect is saturated, it is preferable that 0.01% or less Ca, 0.01% or less Mg, and 0.01% or less REM be added, respectively. In order to improve the toughness, 0.0005% or more Ca, 0.0005% or more Mg, and 0.0005% or more REM are preferably added, respectively.

Further, in the present invention, REM is generally added in a mischmetal, which in addition to La and Ce may also contain other lanthanoid series elements in combination. The effects of the invention are exhibited even when the lanthanoid series elements other than La and Ce are contained as inevitable impurities. However, the effects of the present invention are exhibited even when metals such as La and Ce are added.

(Chemical Composition of Hot-dip Galvanized Layer and Alloyed Hot-dip Galvanized Layer)

In the present invention, a hot-dip galvanized layer formed on the surface of the base steel sheet contains less than 7 mass % Fe, the balance being Zn and inevitable impurities. In addition, an alloyed hot-dip galvanized layer contains 7 to 15 mass % Fe, and the balance being Zn and inevitable impurities. The hot-dip galvanized layer and the alloyed hot-dip galvanized layer may further contain Al of 0.01 to 0.5 mass % and more preferably, may contain Al of 0.05 to 0.3 mass %. Further, the galvanizing bath may contain Fe, Mg, Mn, Si, Cr and the like in addition to pure zinc and Al.

In a case where spot weldability and a coating property are desired, it is possible to improve these properties by forming the alloyed hot-dip galvanized layer containing 7 to 15 mass % Fe on the surface of the base steel sheet. Specifically, when the base steel sheet is subjected to the alloying treatment while being dipped in the galvanizing bath, Fe is incorporated into the galvanized layer, and thus the high-strength alloyed hot-dip galvanized steel sheet having an excellent coating property and spot weldability can be obtained. When the content of Fe after the alloying treatment is less than 7 mass %, the spot weldability becomes insufficient. On the other hand, when the content of Fe exceeds 15 mass %, the adhesion of the galvanized layer itself is impaired, and the galvanized layer is broken and dropped out in machining, thereby causing scratches when forming by adhering to a mold. Accordingly, the content of Fe contained in the galvanized layer during the alloying treatment is within a range of 7 to 15 mass %.

Further, in a case where the alloying treatment is not performed, even when the content of Fe contained in the galvanized layer is less than 7 mass %, the corrosion resistance, the formability, and hole expandability which are effects obtained by the alloying are good except for the spot welding.

Further, the galvanized layer may contain Al, Mg, Mn, Si, Cr, Ni, Cu or the like in addition to Fe.

In order to measure the content of Fe and Al contained in the galvanized layer, a method of dissolving the galvanized layer with an acid and chemically analyzing the dissolved solution may be used. For example, with respect to the alloyed hot-dip galvanized steel sheet cut into 30 mm×40 mm, only the galvanized layer is dissolved while suppressing elution of the base steel sheet with an inhibitor-added 5% HCl aqueous solution. Then, the content of Fe and Al is quantified using signal intensities obtained by ICP emission analysis of the dissolved solution and a calibration curve prepared from concentration-known solutions. Further, in consideration of measured variation of samples, an average value is employed obtained by measuring at least three samples which are cut out from the same alloyed hot-dip galvanized steel sheet.

The coated amount of the plating is not particularly limited, but is preferably 5 $g/m^2$ or more in the coated amount on a single surface of the base steel sheet from the viewpoint of corrosion resistance. In addition, the coated amount on the single surface is preferably no greater than 100 g/m² from the viewpoint of ensuring the plating adhesion.

(Manufacturing Method of Steel Sheet)

Next, a manufacturing method will be described. In the present invention, the steel consisting of the above compositions is casted by melting in a conventional manner. The obtained steel billet (cast slab) is subjected to hot rolling. The cast slab is directly cooled or once cooled and then is heated to 1200° C. or higher, and the hot rolling is finished at an Ar3 transformation temperature or higher.

The base steel sheet (hot-rolled steel sheet) subjected to the hot rolling may be coiled at a temperature region of 700° C. or lower. When the coiling temperature exceeds 700° C., the structure of the hot-rolled steel sheet becomes a coarse ferrite or pearlite structure. As a result, a structure of a final steel sheet becomes a non-uniform structure, and thus it is difficult to obtain good hole expandability. Therefore, the upper limit of the coiling temperature is set to be 700° C. More preferably, the upper limit is 650° C. or lower and, most preferably, is 550° C. at which bainite-single phase is formed. The lower limit of the coiling temperature is not particularly defined. However, when the lower limit is lower than 300° C., the strength of the hot-rolled sheet increases and causes interference of a cold rolling in some cases. Therefore, the lower limit is preferably 300° C. or higher.

Then, the base steel sheet (hot-rolled steel sheet) is subjected to pickling treatment as necessary and then is subjected to the cold rolling at a reduction ratio of 40 to 70%. In order to refine a microstructure after annealing, the cold rolling is performed at the reduction ratio of 40% or more. On the other hand, when the reduction ratio of the cold rolling exceeds 70%, a load is increased by work hardening to cause a loss of productivity. Accordingly, the reduction ratio of the cold rolling is set to be 40 to 70%.

After the cold rolling, the base steel sheet is annealed at 730 to 900° C. In order to control the microstructure of the base steel sheet, a heating temperature of the annealing and cooling conditions are very important in the present invention. The annealing after the cold rolling is performed at the range of 730 to 900° C. to obtain austenite in which C is sufficiently concentrated. When the annealing temperature is lower than 730° C., carbides are melted and remain, and thus a required amount of austenite cannot be obtained. When the annealing temperature exceeds 900° C., it is uneconomical. Further, in a case where the annealing temperature exceeds 900° C., recrystallization proceeds and a grain diameter becomes larger, thereby deteriorating toughness and ductility. Therefore, the annealing temperature is set to be 730 to 900° C.

After being subjected to the annealing, the base steel sheet is cooled to a temperature of 600 to 750° C. at an average cooling rate of 0.1 to 200° C./second. Thereafter, the base steel sheet is cooled to a temperature of 450° C. or lower from a temperature of 600 to 750° C. at an average cooling rate of 20° C./second or faster. The purpose of cooling the base steel sheet to the temperature of 600 to 750° C. at the average cooling rate of 0.1 to 200° C./second from the temperature region of the annealing is to suppress formation of pearlite which occurs during the cooling process. When the cooling rate is slower than 0.1° C./second, it is difficult to avoid pearlite transformation and a part or all of the austenite is transformed into the pearlite, so that it is difficult to obtain the high strength of 980 MP or more. Therefore, the average cooling rate from the temperature region of the annealing to the temperature of 600 to 750° C. is set to be 0.1° C./second or faster. On the other hand, the cooling at the cooling rate of 200° C./second or faster causes not only saturation of the effect but also excessive facility investment, so that economic efficiency becomes poor. Therefore, the upper limit of the cooling rate is set to be 200° C./second.

When the cooling rate from the temperature of 600 to 750° C. to the temperature of 450° C. or lower is slow, bainite transformation proceeds and a large amount of carbides are formed in the bainite structure, so that the austenite is decomposed and thus the ductility becomes weak. In addition, since three kinds of martensites (1) to (3) may not be obtained, the balance of the strength and the hole expandability is low. For this reason, it is necessary to cool at the average cooling rate of 20° C./second or faster. Furthermore, the upper limit is not limited, but when the cooling rate is excessively raised, manufacturing cost increases, and thus the upper limit is preferably 200° C./second or slower.

Next, the base steel sheet is held at the range of 350 to 450° C. for 120 seconds or longer. Further, as described above, when the cooling is performed from the temperature of 600 to 750° C. to the temperature of 450° C. or lower, a cooling stop temperature is set to be 350° C. or higher, and then the base steel sheet may be held at the range of 350 to 450° C. for 120 seconds or longer. Alternatively, when the cooling is performed from the temperature of 600 to 750° C. to the temperature of 450° C. or lower, the cooling stop temperature is set to be lower than 350° C., and then the base steel sheet is re-heated and may be held at the range of 350 to 450° C. for 120 seconds or longer. The reason is because the holding at the temperature region of 350 to 450° C. is to control the stability of austenite. When the holding time is short, the stabilization of austenite is not achieved and a residual austenite 8% or more by volume fraction cannot be obtained. As a result, the balance of the strength and the ductility will be failed. On the other hand, the holding for a long time causes excessive stabilization of the residual austenite, and thus martensite is not formed in the cooling process to room temperature to be subsequently performed and three kinds of martensites (1) to (3) are not obtained. Accordingly, the holding time is preferably set to be 1000 seconds or shorter.

Subsequently, the base steel sheet is cooled once to 70° C. or lower at the average cooling rate of 5° C./second or faster. A cooling attainment temperature may be room temperature. However, since the attainment temperature varies depending on the season, the attainment temperature may be 70° C. or lower in terms of securing materials and may vary depending on the season. In addition, the average cooling rate up to 70° C. needs to be set to be 5° C./second or faster. The upper limit is not particularly determined, but the cooling at the cooling rate over 200° C./second causes not only saturation of the effect but also large facility investment, so that economic efficiency becomes poor. Therefore, the upper limit of the cooling rate is preferably set to be 200° C./second or slower. For this reason, a part of austenite is transformed into martensite. By performing such heat treatment, a composite structure of bainite, a residual austenite, and martensite can be obtained. However, ferrite may be partially contained. Further, the martensite obtained by the cooling up to the room temperature is a fresh martensite which is the origin of the martensite (1).

Next, the base steel sheet cooled to 70° C. or lower is rolled. A part of residual austenite in the base steel sheet is transformed by the rolling working, and thus a strain-induced transformation martensite is generated. Thus, the strain-induced transformation martensite obtained by the rolling is the origin of the martensite (2). The austenite remaining at the room temperature contains C of 0.8 mass % or more, and the strain-induced transformation martensite formed by the transformation of the above austenite becomes hard. In order to obtain a sufficient strain-induced transformation martensite, an elongation percentage (reduction ratio) of the rolling is set to be 0.2 to 2%. The effect is not sufficient when the elongation percentage is less than 0.2%, and the yield ratio is significantly increases and the elongation deteriorates when the elongation percentage exceeds 2%.

Next, after being subjected to Ni pre-plating as necessary, the base steel sheet is subjected to galvanizing or galvanizing and alloying-heating treatment. In the case of performing the Ni pre-plating, after the base steel sheet is subjected to the pickling, the surface of the base steel sheet is removed by polishing to 0.1 μm or more in depth and then Ni is pre-plated on the surface of the base steel sheet with 0.2 to 2 g/m². In order to suppress of galvanizing faults and perform the alloying, the surface of the steel sheet is preferably subjected to the polishing or the Ni pre-plating. The reason is because oxides are easily formed on the surface of the base steel sheet and the galvanizing faults and the alloying treatment delay of the hot-dip galvanizing easily occur through a plurality of heating treatment processes.

After the annealing, oxides of Si, Mn and the like exist in the surface layer of the base steel sheet in some cases. When these oxides exist, even if the base steel sheet is assumed to be subjected to the Ni pre-plating, the galvanizing faults occur in some cases. For this reason, it is necessary to remove the oxides by performing the polishing. Since the effect becomes remarkable by polishing to 0.1 μm or more in depth from the surface layer of the base steel sheet, a polishing quantity is set to be 0.1 μm. The upper limit is not particularly determined. However, since the steel sheet becomes thin and product yield is reduced according to the polishing quantity, the polishing quantity is preferably small.

When a Ni-coated amount is set to be 0.2 to 2 g/m², the galvanizing faults are suppressed at the time of subsequent hot-dip galvanizing. In the Ni-coated amount of less than 0.2 g/m², since the effect of suppressing the galvanizing faults is not sufficiently obtained, the lower limit thereof is set to be 0.2 g/m². The effect of suppressing the galvanizing faults can be obtained without specifically determining the upper limit, but the upper limit exceeding 2.0 g/m² causes not only saturation of the effect but also excessive facility investment, so it is undesirable that the economic efficiency becomes poor. In addition, this requires the excessive facility investment or an operation dropped extremely in sheet-passing speed is required, so it is undesirable that the economic efficiency becomes poor.

A temperature of the base steel sheet to be dipped in the hot-dip galvanizing bath is in a range from a temperature that is lower by 40° C. compared with the temperature of the hot-dip galvanizing bath to a temperature that is higher by 50° C. compared with the temperature of the hot-dip galvanizing bath. When the temperature of the base steel sheet to be dipped is below "temperature of hot-dip galvanizing bath −40" ° C., the heat loss upon dipping into the galvanizing bath becomes large and a part of the molten zinc is solidified, thereby leading to a deterioration of the galvanized external appearance in some cases. In addition, when the temperature of the base steel sheet is above "temperature of hot-dip galvanizing bath +50"° C., operational problems associated with a temperature rise of the galvanizing bath are induced. Further, the temperature of the galvanizing bath is managed to 440 to 470° C. The decrease in temperature of the galvanizing bath leads to solidification of the hot-dip galvanizing existing in the bath and becomes a cause of the galvanizing faults or becomes a cause of appearance deterioration.

Thus, the rolled base steel sheet should be heated to the "temperature of hot-dip galvanizing bath −40"° C. to the "temperature of hot-dip galvanizing bath +50"° C. Here, the base steel sheet is heated at an average temperature rising rate of 10° C./second or higher. Here, when the heating rate is slower than 10° C./second, the surface of the base steel sheet is polished and removed while the Ni pre-plating and the induced strain is relaxed, so that alloying-promoting effect cannot be obtained. In addition, when the heating temperature is lower than the "temperature of hot-dip galvanizing bath −40", the galvanizing faults easily occur during the hot-dip galvanizing. When the heating temperature is above the "temperature of hot-dip galvanizing bath +50"° C., the surface of the base steel sheet is polished and removed and the induced strain is relaxed, so that the alloying-promoting effect cannot be obtained.

In a hot-dip galvanizing tank, it is preferable that a jet flow of 10 m/min or more and 50 m/min or less be provided in the galvanizing bath to suppress the galvanizing faults and to promote the alloying. Scum, which is an oxide film of Zn or Al, is floated on the surface of the galvanizing bath. When the oxide film remains on the surface of the base steel sheet in large amounts, the scum adheres to the surface of the base steel sheet at the time of dipping in the galvanizing bath and the galvanizing faults easily occur. Further, the scum adhering to the steel sheet causes not only the galvanizing faults but also the alloying delay.

This property is particularly remarkable in the steel sheet containing a lot of Si and Mn. The detailed mechanism is unclear, but it is considered that the galvanizing faults and the alloying delay are facilitated by reacting between the oxide of Si or Mn, which is formed on the surface of the base steel sheet, and the scum that is similarly the oxide. The reason for setting the flow rate of the jet flow to be 10 m/min or more and 50 m/min or less is because the suppressing effect of the galvanizing faults due to the jet flow cannot be obtained at the flow rate slower than 10 m/min. The reason for setting the flow rate to be 50 m/min or less is because the suppressing effect of the galvanizing faults is saturated and a high cost due to the excessive facility investment is also avoided.

In addition, the galvanizing bath may contain Fe, Al, Mg, Mn, Si, Cr and the like in addition to pure zinc.

Then, when the base steel sheet is subjected to the hot-dip galvanizing or the hot-dip galvanizing and the alloying treatment by dipping in the hot-dip galvanizing bath, the martensite in the base steel sheet is tempered. That is, as described above, the fresh martensite which is the origin of the martensite (1) and the strain-induced transformation martensite which is the origin of the martensite (2) are contained in the base steel sheet to be dipped into the hot-dip galvanizing bath. When the base steel sheet is subjected to the dipping and the alloying heat treatment in the hot-dip galvanizing bath, the fresh martensite and the strain-induced transformation martensite formed previously in the base steel sheet are tempered. As a result, the martensite (1) and the martensite (2) are formed.

Next, the hot-dip galvanized steel sheet subjected to the hot-dip galvanizing or the alloyed hot-dip galvanized steel sheet subjected to the hot-dip galvanizing and the alloying treatment is cooled to 70° C. or lower. The cooling attainment temperature may be set to be room temperature. However, since the attainment temperature varies depending on the season, the attainment temperature may be 70° C. or lower in terms of securing materials and may vary depending on the season. In addition, the average cooling rate up to 70° C. needs to be set to be 5° C./second or faster. The upper limit is not particularly determined, but the cooling at the cooling rate over 200° C./second causes not only the saturation of the effect but also the large facility investment, so that it is economically undesirable. Therefore, the upper limit of the cooling rate is preferably set to be 200° C./second or slower. By the cooling, a part of residual austenite in the base steel sheet is transformed into martensite. The martensite generated in this way becomes a martensite (3) which has the hardest structure.

In only the heat treatment, only the decomposition of the residual austenite is caused. However, in the present invention, the steel sheet is previously subjected to the rolling and thus the residual austenite is further processed. As a result, a part of residual austenite is transformed into martensite while the cooling after the heat treatment. The martensite (3) obtained as a result becomes a reinforcing structure to achieve high strengthening. The detailed mechanism is unclear, but when the structure of the steel sheet subjected to the rolling was compared with the structure of the steel sheet, which was not subjected to temper rolling, in detail, this martensite was not observed in the steel sheet which was not subjected to the rolling. For this reason, it is assumed that a dislocation induced while the rolling contributes to the martensite transformation at the time of the heat treatment and subsequent treatment.

Furthermore, in order to obtain the martensite (3), it is necessary to heat the base steel sheet to the temperature of "temperature of hot-dip galvanizing bath −40" (° C.) or higher and 560° C. or lower. In the heating at the "temperature of hot-dip galvanizing bath −40" (° C.) or lower, the martensite cannot be obtained while the cooling to be performed subsequently. On the other hand, when the base steel sheet is heated to the temperature exceeding 560° C., carbides are remarkably precipitated and the austenite is decomposed, and thus it is difficult to obtain the amount of residual austenite which is required for elongation improvement. For this reason, in the case of performing the hot-dip galvanizing, the heating temperature of the base steel sheet is set to be 560° C. or lower. In addition, when the time required for the alloying heat treatment is long, the austenite is decomposed. Accordingly, an alloying treatment time is preferably set to be 40 seconds or shorter.

Further, in a facility such as a continuous hot-dip galvanizing facility for continuously performing the heat treatment and plating, the steel sheet is not cooled to the room temperature in a middle course and is not subjected to the rolling in a middle course. Consequently, structure controls of separately manufacturing three kinds of martensites as in the present invention and of ensuring the residual austenite could not be performed. Accordingly, it was difficult to achieve all of the strength, ductility, and hole expandability with a high level.

In addition, when the surface layer of the base steel sheet is pre-plated with Ni after being polished and removed to 0.1 μm or thicker, the alloying is promoted during the alloying-heating treatment after the galvanizing to lower the heating temperature at the time of the alloying treatment. For this reason, the cementite is not generated during the alloying-heating treatment and the deterioration of the hole expandability is avoided. The mechanism of the alloying promotion is unclear, but it is considered that the surface is activated due to the strain induced into the surface layer of the steel sheet by the polishing. Examples of methods of polishing and removing the surface layer of the base steel sheet may include brush polishing, sandpaper polishing, or mechanical polishing. The method of the Ni pre-plating may be any one of electroplating, dipping-plating, and spraying-plating, and plating weight is preferably about 0.2 to 2 g/m². When the polishing and removal amount of the surface layer of the steel sheet is 0.1 μm or less and the Ni pre-plating is not performed, or when the pre-plating weight is 0.2 g/m² or less or 2 g/m², the promotion effect of the alloying is not obtained and the alloying temperature is inevitably raised. Thus, as described below, the deterioration of the hole expandability is not prevented. In order to further obtain the promotion effect of the alloying, the polishing and removal amount of the surface layer of the steel sheet is preferably set to be 0.5 μm or more.

Further, in the case of manufacturing the alloyed hot-dip galvanized steel sheet, an effective Al concentration in the galvanizing bath is preferably controlled in the range of 0.05 to 0.500 mass % to control the properties of the galvanized layer. Here, the effective Al concentration in the galvanizing bath is a value obtained by subtracting a Fe concentration in the galvanizing bath from the Al concentration in the galvanizing bath.

When the effective Al concentration is less than 0.05 mass %, dross significantly occurs and a good appearance cannot be obtained. On the other hand, the effective Al concentration is more than 0.500 mass, the alloying is delayed and the productivity is decreased. From this reason, the upper limit of the effective Al concentration in the galvanizing bath is preferably set to be 0.500 mass %.

In order to improve the coating property and weldability, the surfaces of the hot-dip galvanized steel sheet and the alloyed hot-dip galvanized steel sheet of the present invention may be subjected to upper layer plating and to a variety of treatments, for example, a chromate treatment, a phosphate treatment, a lubricity-improving treatment, a weldability-improving treatment or the like.

After the hot-dip galvanizing and the alloying-heating treatment, the rolling is preferably performed for the purpose of the final shape straightening and the loss of yield-point elongation. When the elongation percentage is less than 0.2%, the effect is not sufficient. On the other hand, when the elongation percentage exceeds 1%, the yield ratio dramatically increases and the elongation deteriorates. Therefore, the elongation percentage is preferably set to be 0.2 to 1%. In addition, before dipping into the galvanizing bath, the steel sheet may be subjected to the pickling after the annealing to remove scales generated while annealing.

EXAMPLE(S)

The effects of the present invention will be now described in more detail using Example. Incidentally, conditions of the examples are condition examples employed for confirming the applicability and effects of the present invention, and the present invention is not limited to these condition examples. The present invention can employ various conditions as long as the object of the present invention is achieved without departing from the gist of the present invention.

A hot-dip galvanized steel sheet and an alloyed hot-dip galvanized steel sheet were manufactured under conditions indicated in Tables 2 and 3 by casting steel having compositions indicated in Table 1. First, steel slabs having each composition were heated to a slab heating temperature (° C.) and then the hot rolling was finished at a finish rolling temperature (° C.). The obtained hot-rolled steel sheet was coiled at a coiling temperature (° C.) and then was subjected to the cold rolling indicated by a cold rolling ratio (%).

Further, since a sheet shape is poor when the steel sheet was subjected to the cold rolling at a cold rolling ratio of 30% (cold rolling ratio less than 40%) and occurrence of scratches was concerned when the sheet subsequently passed through an annealing facility, the sheet-passing was abandoned. In addition, when the cold rolling was performed at a cold rolling ratio of 80% (cold rolling ratio exceeding 70%), the rolling load became a maximum value and a predetermined sheet thickness was not obtained, so that the cold rolling at the cold rolling ratio of 80% was abandoned.

After the cold rolling, the base steel sheet was annealed at the annealing temperature (° C.), was cooled (primary cooling) to a primary cooling temperature (° C.) at a primary cooling rate (° C./sec.), and then was cooled (secondary cooling) to a cooling stop temperature (° C.) at a secondary cooling rate (° C./sec.). Then, the base steel sheet was held at a holding temperature (° C.) for a holding time (sec.).

Thereafter, the base steel sheet was cooled to 70° C. or lower for the average cooling rate of 5° C./second or faster and then was rolled at a rolling ratio (elongation percentage) (%). The sheet thickness was 1.4 mm. Thereafter, the surface of the base steel sheet was polished and removed up to a depth of a surface polishing quantity (μm) and then was subjected to the Ni pre-plating with the Ni pre-plating weight (g/m$^2$).

Next, the base steel sheet was heated to the heating temperature (° C.) at a temperature rising rate (° C./sec.) and then was subjected to the hot-dip galvanizing by dipping into the hot-dip galvanizing bath. In addition the base steel sheet was subjected to the alloying-heating treatment for an alloying time (sec.) at the alloying temperature (° C.), as necessary. Further, the speed of the jet flow (m/min) in the galvanizing bath was provided in a hot-dip galvanizing tank. In addition, the temperature of the galvanizing bath was managed to 440 to 470° C.

Thereafter, the base steel sheet was cooled to 70° C. or lower at the average cooling rate of 5° C./second or faster.

Mechanical properties, hole expandability (λ), a galvanized external appearance, an alloying degree, and plating adhesion of the obtained hot-dip galvanized steel sheet and the alloyed hot-dip galvanized steel sheet were estimated (Table 4). The mechanical properties were estimated by a tensile test based on JIS Z 2241. Tensile strength (TS) and total elongation (EL) were calculated from a stress-strain curve of the tensile test. Then, TS×EL and TS×λ as an indication of workability were calculated. The hole expandability was estimated by performing a hole expanding test based on Japan Iron and Steel Federation Standard JFS T 1001 to measure a hole expanding ratio. It was determined that the formability was good when the TS×EL was 17000 MPa·% or more and the TS×λ 40000 MPa·% or more. The galvanized external appearance was estimated as marks ○ and x by determining the presence or absence of the galvanizing faults through visual observation. Here, the mark ○ indicates that no galvanizing fault is present, and the mark x indicates that the galvanizing faults are present. The alloying Fe % indicates a mass % of Fe contained in the galvanized layer. In the alloyed hot-dip galvanized steel sheet subjected to the alloying treatment, the content of 7 to 15% Fe indicates that the alloying has well advanced. In the hot-dip galvanized steel sheet which is not subjected to the alloying treatment, the content of Fe may be 7% or less.

Experiments No. a, ba, bt, c, d, e, fa, g, ha, ht, i, j, k, l, m, n, and o are the present invention examples in which all of the properties pass and the steel sheet of the aimed property is obtained. On the other hand, in other Experiments No., in which composition or manufacturing method is out of the range of the present invention, several properties fail to pass.

TABLE 1

| Steel type No. | C | Si | Mn | P | S | N | Al | Al + Si | Others | Note |
|---|---|---|---|---|---|---|---|---|---|---|
| 1 | 0.13 | 1.5 | 2.7 | 0.01 | 0.002 | 0.004 | 0.015 | 1.515 | — | Inventive steel |
| 2 | 0.18 | 1.5 | 2.4 | 0.012 | 0.003 | 0.0033 | 0.018 | 1.518 | — | Inventive steel |
| 3 | 0.19 | 2.7 | 1.6 | 0.011 | 0.004 | 0.0043 | 1.213 | 3.913 | Cr: 0.96 | Inventive steel |
| 4 | 0.18 | 0.1 | 2.5 | 0.013 | 0.004 | 0.0022 | 0.51 | 0.61 | Ce: 0.01, La: 0.002, V: 0.4 | Inventive steel |
| 5 | 0.28 | 1.8 | 1.6 | 0.012 | 0.01 | 0.0022 | 0.576 | 2.376 | — | Inventive steel |
| 6 | 0.27 | 0.6 | 2.4 | 0.01 | 0.0013 | 0.0024 | 1.751 | 2.351 | Mg: 0.0008 | Inventive steel |
| 7 | 0.23 | 1.7 | 2.5 | 0.02 | 0.0023 | 0.0029 | 0.019 | 1.719 | Ca: 0.008 | Inventive steel |
| 8 | 0.35 | 1.6 | 2.4 | 0.01 | 0.0014 | 0.0034 | 0.785 | 2.385 | — | Inventive steel |
| 9 | 0.19 | 1.5 | 1.9 | 0.02 | 0.002 | 0.0041 | 0.58 | 2.08 | Ti: 0.03 | Inventive steel |
| 10 | 0.19 | 1.4 | 1.7 | 0.03 | 0.001 | 0.002 | 0.46 | 1.86 | B: 0.001 | Inventive steel |
| 11 | 0.18 | 1.3 | 1.8 | 0.02 | 0.002 | 0.0024 | 0 | 1.3 | Mo: 0.1 | Inventive steel |
| 12 | 0.2 | 1.8 | 2.6 | 0.03 | 0.001 | 0.0033 | 0.08 | 1.88 | Cr: 0.8 | Inventive steel |
| 13 | 0.19 | 1.7 | 2.5 | 0.013 | 0.0015 | 0.0012 | 0.023 | 1.723 | Nb: 0.051 | Inventive steel |
| 14 | 0.21 | 1.5 | 2.4 | 0.006 | 0.0042 | 0.0043 | 0.033 | 1.533 | Ti: 0.056, B: 0.0053 | Inventive steel |
| 15 | 0.19 | 1.8 | 1.8 | 0.011 | 0.0032 | 0.0027 | 0.016 | 1.816 | Mo: 0.33 | Inventive steel |
| 16 | <u>0.7</u> | 2.4 | 2.3 | 0.013 | 0.0047 | 0.0039 | 0.032 | 2.432 | — | Comparative steel |
| 17 | 0.18 | <u>3.4</u> | 2.5 | 0.014 | 0.0037 | 0.0015 | 0.048 | 3.448 | — | Comparative steel |
| 18 | 0.25 | 2 | <u>3.5</u> | 0.014 | 0.0049 | 0.0012 | 0.069 | 2.069 | Ca: 0.015 | Comparative steel |
| 22 | 0.19 | 1.75 | 2.64 | 0.08 | 0.0015 | 0.005 | <u>2.36</u> | 4.11 | Ca: 0.003 | Comparative steel |
| 23 | 0.35 | 0.1 | 2.4 | 0.08 | 0.0015 | 0.005 | 0.164 | <u>0.264</u> | — | Comparative steel |
| 24 | 0.09 | 2.87 | 1.8 | 0.0022 | 0.0006 | 0.002 | 0.02 | 2.89 | <u>Cr: 1.8</u> | Comparative steel |
| 25 | 0.11 | 1.7 | 2.9 | 0.0006 | 0.0007 | 0.0003 | 0.08 | 1.78 | <u>Ti: 0.9</u> | Comparative steel |

Underlines indicate that a numeral value is out of the range of the present invention

TABLE 2

| Experiment No. | Steel type No. | Slab heating temperature [° C.] | Finish rolling temperature [° C.] | Coiling temperature [° C.] | Cold rolling ratio [%] | Annealing temperature [° C.] | Primary cooling temperature [° C.] | Primary cooling rate [° C./sec] | Secondary cooling rate [° C./sec] | Cooling stop temperature [° C.] | Note |
|---|---|---|---|---|---|---|---|---|---|---|---|
| a | 1 | 1230 | 900 | 500 | 50 | 880 | 690 | 1.2 | 120 | 370 | Present invention steel |
| ba | 2 | 1230 | 890 | 640 | 55 | 820 | 680 | 1.9 | 50 | 290 | Present invention steel |
| bb | 2 | 1220 | 890 | 650 | 55 | 700 | 670 | 10.7 | 60 | 380 | Comparative steel |
| bc | 2 | 1200 | 900 | 590 | 55 | 790 | 520 | 1.5 | 120 | 380 | Comparative steel |
| bd | 2 | 1180 | 920 | 620 | 55 | 800 | 650 | 0.03 | 180 | 370 | Comparative steel |
| be | 2 | 1200 | 910 | 570 | 55 | 810 | 670 | 1.2 | 8 | 400 | Comparative steel |
| bf | 2 | 1230 | 930 | 630 | 55 | 810 | 740 | 1.8 | 60 | 370 | Comparative steel |
| bg | 2 | 1200 | 890 | 580 | 55 | 820 | 710 | 1.2 | 50 | 350 | Comparative steel |
| bh | 2 | 1190 | 920 | 600 | 55 | 810 | 730 | 1.6 | 60 | 420 | Comparative steel |
| bi | 2 | 1210 | 890 | 590 | 55 | 800 | 740 | 1.5 | 50 | 400 | Comparative steel |
| bj | 2 | 1220 | 880 | 580 | 55 | 820 | 710 | 2.7 | 70 | 380 | Comparative steel |
| bk | 2 | 1210 | 890 | 600 | 55 | 810 | 720 | 2.3 | 80 | 390 | Comparative steel |
| bl | 2 | 1200 | 970 | 600 | 55 | 820 | 710 | 3.8 | 120 | 390 | Comparative steel |
| bm | 2 | 1230 | 930 | 600 | 55 | 820 | 710 | 3.8 | 100 | 400 | Comparative steel |
| bn | 2 | 1210 | 920 | 610 | 55 | 830 | 680 | 3.8 | 120 | 390 | Comparative steel |
| bo | 2 | 1200 | 900 | 640 | 55 | 820 | 680 | 4.5 | 60 | 420 | Comparative steel |
| bp | 2 | 1200 | 880 | 530 | 55 | 820 | 680 | 1.2 | 80 | 70 | Comparative steel |
| bq | 2 | 1250 | 920 | 540 | 55 | 830 | 690 | 1.2 | 80 | 50 | Comparative steel |
| br | 2 | 1240 | 920 | 580 | 55 | 820 | 680 | 1.2 | 80 | 500 | Comparative steel |
| bs | 2 | 1230 | 900 | 600 | 55 | 820 | 680 | 1.2 | 70 | 580 | Comparative steel |
| bt | 2 | 1230 | 920 | 580 | 55 | 820 | 690 | 1.2 | 120 | 320 | Present invention steel |
| c | 3 | 1210 | 880 | 550 | 57 | 880 | 690 | 3.4 | 80 | 360 | Present invention steel |
| d | 4 | 1230 | 930 | 500 | 49 | 850 | 690 | 1.8 | 70 | 430 | Present invention steel |
| e | 5 | 1230 | 950 | 500 | 60 | 870 | 690 | 2.9 | 60 | 400 | Present invention steel |
| fa | 6 | 1230 | 890 | 500 | 48 | 880 | 720 | 13.5 | 50 | 390 | Present invention steel |
| fb | 6 | 1220 | 870 | 600 | 50 | 680 | 680 | 2.4 | 100 | 400 | Comparative steel |
| fc | 6 | 1200 | 890 | 540 | 50 | 820 | 530 | 2.4 | 120 | 400 | Comparative steel |
| fd | 6 | 1190 | 900 | 490 | 50 | 800 | 650 | 0.06 | 140 | 410 | Comparative steel |
| fe | 6 | 1200 | 930 | 590 | 50 | 840 | 670 | 1.6 | 6 | 390 | Comparative steel |
| ff | 6 | 1230 | 890 | 560 | 50 | 850 | 720 | 2.4 | 80 | 430 | Comparative steel |
| fg | 6 | 1200 | 900 | 630 | 50 | 840 | 700 | 1.6 | 60 | 450 | Comparative steel |
| fh | 6 | 1220 | 960 | 590 | 50 | 850 | 720 | 2.2 | 50 | 370 | Comparative steel |
| fi | 6 | 1220 | 950 | 560 | 50 | 840 | 710 | 1.6 | 70 | 390 | Comparative steel |
| fj | 6 | 1200 | 920 | 590 | 50 | 860 | 690 | 2.8 | 100 | 400 | Comparative steel |
| fk | 6 | 1210 | 900 | 630 | 50 | 830 | 720 | 2.4 | 130 | 400 | Comparative steel |
| fl | 6 | 1240 | 960 | 420 | 50 | 840 | 700 | 5.6 | 120 | 390 | Comparative steel |
| fm | 6 | 1180 | 890 | 550 | 50 | 850 | 690 | 2.4 | 90 | 390 | Comparative steel |

TABLE 2-continued

| Experiment No. | Steel type No. | Slab heating temperature [° C.] | Finish rolling temperature [° C.] | Coiling temperature [° C.] | Cold rolling ratio [%] | Annealing temperature [° C.] | Primary cooling temperature [° C.] | Primary cooling rate [° C./sec] | Secondary cooling rate [° C./sec] | Cooling stop temperature [° C.] | Note |
|---|---|---|---|---|---|---|---|---|---|---|---|
| fn | 6 | 1200 | 900 | 490 | 50 | 840 | 710 | 6.2 | 80 | 390 | Comparative steel |
| fo | 6 | 1210 | 910 | 500 | 50 | 830 | 710 | 2.4 | 60 | 400 | Comparative steel |
| fp | 6 | 1230 | 930 | 550 | 50 | 810 | 700 | 2.4 | 70 | <u>70</u> | Comparative steel |
| fq | 6 | 1210 | 880 | 600 | 50 | 810 | 680 | 2.4 | 70 | <u>50</u> | Comparative steel |
| fr | 6 | 1240 | 900 | 590 | 50 | 810 | 680 | 2.4 | 60 | <u>520</u> | Comparative steel |
| fs | 6 | 1220 | 910 | 610 | 50 | 810 | 680 | 2.4 | 60 | <u>590</u> | Comparative steel |
| g | 7 | 1250 | 900 | 600 | 49 | 830 | 680 | 10.8 | 70 | 410 | Present invention steel |
| ha | 8 | 1250 | 980 | 550 | 50 | 880 | 740 | 16.4 | 100 | 420 | Present invention steel |
| hb | 8 | 1220 | 910 | 560 | 50 | <u>650</u> | 680 | 1.6 | 120 | 380 | Comparative steel |
| hc | 8 | 1180 | 890 | 600 | 50 | 840 | <u>530</u> | 1.6 | 100 | 380 | Comparative steel |
| hd | 8 | 1200 | 900 | 620 | 50 | 830 | 660 | <u>0.06</u> | 160 | 400 | Comparative steel |
| he | 8 | 1190 | 940 | 550 | 50 | 800 | 690 | 1.4 | <u>4</u> | 400 | Comparative steel |
| hf | 8 | 1210 | 890 | 590 | 50 | 780 | 730 | 1.6 | 80 | 380 | Comparative steel |
| hg | 8 | 1200 | 920 | 600 | 50 | 810 | 680 | 1.8 | 50 | 370 | Comparative steel |
| hh | 8 | 1190 | 910 | 570 | 50 | 830 | 710 | 2.4 | 60 | 410 | Comparative steel |
| hi | 8 | 1200 | 900 | 580 | 50 | 860 | 720 | 2.8 | 190 | 400 | Comparative steel |
| hj | 8 | 1190 | 880 | 480 | 50 | 780 | 740 | 2.4 | 100 | 390 | Comparative steel |
| hk | 8 | 1200 | 950 | 550 | 50 | 810 | 700 | 2.6 | 80 | 390 | Comparative steel |
| hl | 8 | 1210 | 920 | 540 | 50 | 820 | 710 | 4.8 | 60 | 380 | Comparative steel |
| hm | 8 | 1190 | 890 | 600 | 50 | 830 | 700 | 5.8 | 70 | 360 | Comparative steel |
| hn | 8 | 1200 | 960 | 620 | 50 | 820 | 730 | 2.6 | 70 | 430 | Comparative steel |
| ho | 8 | 1200 | 930 | 580 | 50 | 830 | 720 | 1.6 | 80 | 400 | Comparative steel |
| hp | 8 | 1230 | 900 | 600 | 50 | 780 | 680 | 1.6 | 80 | <u>70</u> | Comparative steel |
| hq | 8 | 1250 | 880 | 610 | 50 | 780 | 680 | 1.6 | 80 | <u>50</u> | Comparative steel |
| hr | 8 | 1200 | 930 | 600 | 50 | 780 | 690 | 1.2 | 60 | <u>520</u> | Comparative steel |
| hs | 8 | 1220 | 920 | 590 | 50 | 780 | 680 | 1.2 | 60 | <u>600</u> | Comparative steel |
| ht | 8 | 1200 | 880 | 570 | 50 | 780 | 660 | 2.1 | 80 | 200 | Present invention steel |
| i | 9 | 1230 | 920 | 630 | 50 | 840 | 690 | 2.5 | 120 | 410 | Present invention steel |
| j | 10 | 1210 | 890 | 620 | 50 | 840 | 680 | 2.4 | 90 | 400 | Present invention steel |
| k | 11 | 1230 | 870 | 650 | 45 | 850 | 690 | 1.9 | 60 | 400 | Present invention steel |
| l | 12 | 1250 | 930 | 550 | 60 | 860 | 690 | 10.9 | 80 | 390 | Present invention steel |
| m | 13 | 1220 | 940 | 530 | 50 | 840 | 680 | 5.4 | 90 | 390 | Present invention steel |
| n | 14 | 1230 | 910 | 560 | 50 | 850 | 680 | 8.2 | 100 | 380 | Present invention steel |
| o | 15 | 1240 | 950 | 600 | 50 | 860 | 690 | 6.2 | 90 | 430 | Present invention steel |
| p | <u>16</u> | 1250 | 950 | 500 | 60 | 810 | 730 | 1.9 | 60 | 430 | Comparative steel |
| q | <u>17</u> | 1230 | 960 | 600 | 50 | 780 | 700 | 1.8 | 120 | 400 | Comparative steel |
| r | <u>18</u> | 1260 | 920 | 650 | 50 | 840 | 650 | 2.5 | 70 | 420 | Comparative steel |

TABLE 2-continued

| Experiment No. | Steel type No. | Slab heating temperature [° C.] | Finish rolling temperature [° C.] | Coiling temperature [° C.] | Cold rolling ratio [%] | Annealing temperature [° C.] | Primary cooling temperature [° C.] | Primary cooling rate [° C./sec] | Secondary cooling rate [° C./sec] | Cooling stop temperature [° C.] | Note |
|---|---|---|---|---|---|---|---|---|---|---|---|
| v | <u>22</u> | 1200 | 890 | 450 | 50 | 850 | 680 | 10.9 | 80 | 410 | Comparative steel |
| w | <u>23</u> | 1260 | 910 | 490 | 50 | 850 | 630 | 11.3 | 80 | 390 | Comparative steel |
| x | <u>24</u> | 1240 | 900 | 420 | 50 | 850 | 670 | 15.4 | 120 | 370 | Comparative steel |
| y | <u>25</u> | 1230 | 900 | 560 | 50 | 850 | 620 | 13.5 | 100 | 380 | Comparative steel |

Underlines indicate that a numeral value is out of the range of the present invention

TABLE 3

| Experiment No. | Steel type No. | Holding temperature [° C.] | Holding time at 350 to 450° C. [sec] | Reduction ratio [%] | Surface polishing quantity [μm] | Ni pre-plating weight [g/m²] | Speed of jet flow in galvanizing bath [m/min] | Temperature rising rate [° C./sec] | Heating temperature [° C.] | Alloying time [sec] | Alloying temperature [° C.] | Note |
|---|---|---|---|---|---|---|---|---|---|---|---|---|
| a | 1 | 370 | 150 | 0.4 | 0.15 | 0.21 | 20 | 12.4 | 435 | 15 | 475 | Present invention steel |
| ba | 2 | 400 | 180 | 0.4 | 0.16 | 0.32 | 15 | 11.4 | 462 | 24 | 480 | Present invention steel |
| bb | 2 | 380 | 178 | 0.6 | 0.35 | 1.4 | 10 | 16.8 | 495 | 20 | 490 | Comparative steel |
| bc | 2 | 380 | 162 | 0.2 | 0.7 | 0.9 | 45 | 25.3 | 437 | 35 | 505 | Comparative steel |
| bd | 2 | 370 | 250 | 0.3 | 0.15 | 0.4 | 20 | 22.1 | 421 | 30 | 523 | Comparative steel |
| be | 2 | 400 | 420 | 0.4 | 0.21 | 0.3 | 20 | 24.5 | 460 | 25 | 510 | Comparative steel |
| bf | 2 | 370 | 10 | 0.2 | 0.36 | 0.2 | 25 | 26.5 | 468 | 31 | 545 | Comparative steel |
| bg | 2 | 350 | 240 | 0 | 0.21 | 0.2 | 25 | 25.3 | 478 | 24 | 490 | Comparative steel |
| bh | 2 | 420 | 240 | <u>2.8</u> | 0.22 | 0.4 | 20 | 28.4 | 469 | 19 | 500 | Comparative steel |
| bi | 2 | 400 | 120 | 0.3 | <u>0</u> | 1.3 | 20 | 22.2 | 458 | 25 | 510 | Comparative steel |
| bj | 2 | 380 | 150 | 0.2 | 0.15 | <u>0.08</u> | 20 | 24.6 | 423 | 15 | 520 | Comparative steel |
| bk | 2 | 390 | 240 | 0.3 | 0.12 | 0.8 | <u>4</u> | 17.6 | 485 | 20 | 500 | Comparative steel |
| bl | 2 | 390 | 150 | 0.2 | 0.15 | 1.5 | 20 | <u>3.2</u> | 427 | 19 | 540 | Comparative steel |
| bm | 2 | 400 | 150 | 0.3 | 0.15 | 1.5 | 25 | 20.5 | <u>390</u> | 15 | 520 | Comparative steel |
| bn | 2 | 390 | 150 | 0.4 | 0.46 | 1.5 | 20 | 22.4 | 456 | <u>130</u> | 520 | Comparative steel |
| bo | 2 | 420 | 150 | 0.3 | 0.46 | 1.5 | 20 | 10.5 | 450 | 15 | <u>620</u> | Comparative steel |
| bp | 2 | 360 | 150 | 0.4 | 0.22 | 0.4 | 15 | 12.4 | 450 | 20 | 510 | Comparative steel |
| bq | 2 | <u>90</u> | 150 | 0.4 | 0.24 | 0.4 | 15 | 20.3 | 460 | 20 | 500 | Comparative steel |
| br | 2 | 450 | 150 | 0.4 | 0.18 | 0.4 | 20 | 12.4 | 460 | 20 | 500 | Comparative steel |
| bs | 2 | <u>520</u> | 150 | 0.4 | 0.21 | 0.4 | 20 | 12.4 | 450 | 20 | 510 | Comparative steel |
| bt | 2 | 380 | 220 | 0.3 | 0.24 | 2.24 | 15 | 14.8 | 510 | 25 | 520 | Present invention steel |
| c | 3 | 360 | 170 | 0.4 | 0.17 | 0.26 | 20 | 20.6 | 486 | 35 | 520 | Present invention steel |
| d | 4 | 430 | 120 | 0.2 | 0.26 | 1.24 | 20 | 16.8 | 425 | 21 | 560 | Present invention steel |

TABLE 3-continued

| Experiment No. | Steel type No. | Holding temperature [° C.] | Holding time at 350 to 450° C. [sec] | Reduction ratio [%] | Surface polishing quantity [μm] | Ni pre-plating weight [g/m²] | Speed of jet flow in galvanizing bath [m/min] | Temperature rising rate [° C./sec] | Heating temperature [° C.] | Alloying time [sec] | Alloying temperature [° C.] | Note |
|---|---|---|---|---|---|---|---|---|---|---|---|---|
| e | 5 | 400 | 190 | 0.3 | 0.13 | 1.87 | 15 | 10.4 | 437 | 13 | 590 | Present invention steel |
| fa | 6 | 390 | 400 | 0.3 | 0.24 | 1.44 | 25 | 16.5 | 480 | 14 | 490 | Present invention steel |
| fb | 6 | 400 | 500 | 0.4 | 0.22 | 0.4 | 30 | 10.8 | 480 | 20 | 480 | Comparative steel |
| fc | 6 | 400 | 260 | 0.3 | 0.23 | 0.3 | 15 | 16.8 | 470 | 16 | 490 | Comparative steel |
| fd | 6 | 410 | 500 | 0.4 | 0.16 | 0.6 | 10 | 16.8 | 460 | 24 | 480 | Comparative steel |
| fe | 6 | 390 | 500 | 0.3 | 0.26 | 0.3 | 15 | 16.8 | 450 | 30 | 500 | Comparative steel |
| ff | 6 | 430 | 0 | 0.3 | 0.2 | 0.4 | 15 | 10.5 | 480 | 16 | 500 | Comparative steel |
| fg | 6 | 450 | 180 | 0 | 0.16 | 0.3 | 20 | 16.8 | 480 | 24 | 490 | Comparative steel |
| fh | 6 | 370 | 200 | 1.6 | 0.12 | 0.4 | 15 | 20.4 | 450 | 30 | 500 | Comparative steel |
| fi | 6 | 390 | 500 | 0.8 | 0.04 | 0.3 | 25 | 12.4 | 460 | 8 | 540 | Comparative steel |
| fj | 6 | 400 | 250 | 0.8 | 0.16 | 0 | 20 | 10.9 | 450 | 16 | 510 | Comparative steel |
| fk | 6 | 400 | 125 | 0.7 | 0.32 | 0.3 | 7 | 20.4 | 460 | 30 | 490 | Comparative steel |
| fl | 6 | 390 | 240 | 0.6 | 0.18 | 0.2 | 20 | 1.8 | 480 | 24 | 490 | Comparative steel |
| fm | 6 | 390 | 330 | 0.9 | 0.2 | 0.4 | 45 | 16.8 | 370 | 30 | 480 | Comparative steel |
| fn | 6 | 390 | 500 | 0.7 | 0.16 | 0.5 | 20 | 20.5 | 490 | 200 | 540 | Comparative steel |
| fo | 6 | 400 | 330 | 0.8 | 0.22 | 0.5 | 20 | 30.7 | 500 | 28 | 650 | Comparative steel |
| fp | 6 | 370 | 200 | 0.2 | 0.43 | 0.22 | 20 | 10.6 | 520 | 28 | 500 | Comparative steel |
| fq | 6 | 80 | 200 | 0.6 | 0.62 | 0.45 | 20 | 20.8 | 510 | 28 | 500 | Comparative steel |
| fr | 6 | 450 | 200 | 0.4 | 0.26 | 0.25 | 20 | 25.4 | 500 | 28 | 490 | Comparative steel |
| fs | 6 | 540 | 200 | 0.3 | 0.14 | 0.31 | 20 | 20.4 | 500 | 24 | 500 | Comparative steel |
| g | 7 | 410 | 300 | 0.2 | 0.34 | 0.58 | 30 | 18.4 | 470 | 30 | — | Present invention steel |
| ha | 8 | 420 | 260 | 0.2 | 0.16 | 0.24 | 20 | 19.3 | 459 | — | — | Present invention steel |
| hb | 8 | 380 | 250 | 0.4 | 0.12 | 0.6 | 20 | 20.3 | 455 | 20 | 490 | Comparative steel |
| hc | 8 | 380 | 260 | 0.3 | 0.18 | 0.3 | 15 | 19.6 | 460 | 30 | 500 | Comparative steel |
| hd | 8 | 400 | 180 | 1 | 0.22 | 0.4 | 30 | 14.5 | 470 | 20 | 510 | Comparative steel |
| he | 8 | 400 | 470 | 0.4 | 0.18 | 0.3 | 25 | 20.5 | 480 | 28 | 520 | Comparative steel |
| hf | 8 | 380 | 0 | 0.9 | 0.24 | 0.3 | 25 | 10.8 | 455 | 24 | 490 | Comparative steel |
| hg | 8 | 370 | 190 | 0 | 0.24 | 0.4 | 20 | 15.6 | 480 | 20 | 480 | Comparative steel |
| hh | 8 | 410 | 320 | 2.2 | 0.16 | 0.3 | 15 | 16.8 | 500 | 24 | 490 | Comparative steel |
| hi | 8 | 400 | 450 | 0.8 | 0.06 | 0.4 | 30 | 30.8 | 460 | 45 | 500 | Comparative steel |
| hj | 8 | 390 | 260 | 0.7 | 0.18 | 0.05 | 40 | 20.4 | 460 | 20 | 510 | Comparative steel |
| hk | 8 | 390 | 180 | 0.8 | 0.24 | 0.4 | 5 | 18.6 | 480 | 30 | 480 | Comparative steel |
| hl | 8 | 380 | 220 | 0.5 | 0.16 | 0.8 | 20 | 0.8 | 500 | 20 | 470 | Comparative steel |
| hm | 8 | 360 | 180 | 0.6 | 0.12 | 1.6 | 50 | 18.2 | 290 | 24 | 480 | Comparative steel |

TABLE 3-continued

| Experiment No. | Steel type No. | Holding temperature [° C.] | Holding time at 350 to 450° C. [sec] | Reduction ratio [%] | Surface polishing quantity [μm] | Ni pre-plating weight [g/m²] | Speed of jet flow in galvanizing bath [m/min] | Temperature rising rate [° C./sec] | Heating temperature [° C.] | Alloying time [sec] | Alloying temperature [° C.] | Note |
|---|---|---|---|---|---|---|---|---|---|---|---|---|
| hn | 8 | 430 | 460 | 0.8 | 0.16 | 0.8 | 25 | 20.8 | 460 | <u>200</u> | 510 | Comparative steel |
| ho | 8 | 400 | 280 | 0.3 | 0.16 | 0.6 | 10 | 26.8 | 480 | 30 | <u>630</u> | Comparative steel |
| hp | 8 | 350 | 330 | 0.4 | 0.22 | 0.4 | 15 | 10.8 | 470 | 30 | 480 | Comparative steel |
| hq | 8 | <u>80</u> | 330 | 0.5 | 0.14 | 0.3 | 20 | 20.5 | 450 | 24 | 480 | Comparative steel |
| hr | 8 | 450 | 330 | 0.4 | 0.32 | 0.2 | 15 | 14.6 | 470 | 45 | 480 | Comparative steel |
| hs | 8 | <u>550</u> | 330 | 0.3 | 0.28 | 0.6 | 20 | 14.9 | 460 | 30 | 480 | Comparative steel |
| ht | 8 | 380 | 640 | 0.4 | 0.62 | 0.2 | 30 | 16.8 | 460 | 30 | 510 | Present invention steel |
| i | 9 | 410 | 180 | 0.4 | 0.15 | 0.32 | 20 | 11.4 | 460 | 24 | 480 | Present invention steel |
| j | 10 | 400 | 190 | 0.2 | 0.19 | 0.22 | 20 | 25.5 | 450 | 35 | 490 | Present invention steel |
| k | 11 | 400 | 250 | 0.3 | 0.26 | 0.99 | 20 | 36.5 | 455 | 21 | 550 | Present invention steel |
| l | 12 | 390 | 280 | 0.5 | 0.24 | 1.5 | 20 | 19.7 | 449 | — | — | Present invention steel |
| m | 13 | 390 | 800 | 0.4 | 0.18 | 0.23 | 20 | 20.8 | 460 | — | — | Present invention steel |
| n | 14 | 380 | 260 | 0.3 | 0.11 | 0.33 | 20 | 8.8 | 450 | 16 | 530 | Present invention steel |
| o | 15 | 430 | 300 | 0.6 | 0.06 | 0.27 | 20 | 30.9 | 455 | 9 | — | Present invention steel |
| p | <u>16</u> | 430 | 120 | 0.3 | 0.16 | 1.55 | 40 | 10.6 | 462 | 15 | 480 | Comparative steel |
| q | <u>17</u> | 400 | 130 | 0.4 | 0.24 | 1.24 | 20 | 10.8 | 435 | 16 | 479 | Comparative steel |
| r | <u>18</u> | 420 | 250 | 0.5 | 0.52 | 1.5 | 20 | 12.5 | 458 | 17 | 510 | Comparative steel |
| v | <u>22</u> | 410 | 250 | 0.2 | 0.12 | 0.24 | 10 | 10.8 | 428 | 30 | 490 | Comparative steel |
| w | <u>23</u> | 390 | 260 | 0.7 | 0.12 | 0.26 | 15 | 15.5 | 437 | 25 | 475 | Comparative steel |
| x | <u>24</u> | 370 | 200 | 0.6 | 0.15 | 0.35 | 25 | 18.6 | 461 | 19 | 480 | Comparative steel |
| y | <u>25</u> | 380 | 120 | 0.4 | 0.15 | 0.45 | 30 | 14.6 | 478 | — | — | Comparative steel |

Underlines indicate that a numeral value is out of the range of the present invention

TABLE 4

| Experiment No. | Bainite [%] | Martensite ① [%] | Martensite ② [%] | Martensite ③ [%] | Bainite + Martensite [%] | Residual austenite [%] | Ferrite [%] | Pearlite [%] | TS [MPa] | EL [%] | λ [%] | TS × EL | TS × λ | Galvanized external appearance | Alloying Fe [%] | Note |
|---|---|---|---|---|---|---|---|---|---|---|---|---|---|---|---|---|
| a | 47 | 14 | 3 | 0 | 64 | 8 | 28 | 0 | 987 | 23 | 59 | 22701 | 58233 | ○ | 7.8 | Present invention steel |
| ba | 32 | 4 | 4 | 3 | 43 | 9 | 38 | 10 | 1013 | 25 | 48 | 25325 | 48624 | ○ | 10.4 | Present invention steel |
| bb | 0 | 0 | 0 | 0 | 0 | 0 | 100 | 0 | 683 | 21 | 67 | 14343 | 45761 | ○ | 10.5 | Comparative steel |
| bc | 23 | 0 | 0 | 0 | 23 | 0 | 62 | 15 | 743 | 18 | 29 | 13374 | 21547 | ○ | 11.1 | Comparative steel |
| bd | 23 | 0 | 0 | 0 | 23 | 0 | 55 | 22 | 789 | 15 | 25 | 11835 | 19725 | ○ | 11.9 | Comparative steel |
| be | 38 | 0 | 0 | 0 | 38 | 0 | 49 | 13 | 824 | 16 | 29 | 13184 | 23896 | ○ | 11.2 | Comparative steel |
| bf | 11 | 33 | 14 | 2 | 60 | 2 | 38 | 0 | 1139 | 11 | 24 | 12529 | 27336 | ○ | 10.9 | Comparative steel |
| bg | 35 | 10 | 0 | 0 | 45 | 16 | 39 | 0 | 1037 | 26 | 24 | 26962 | 24888 | ○ | 8.9 | Comparative steel |
| bh | 34 | 6 | 12 | 0 | 52 | 3 | 37 | 8 | 923 | 16 | 55 | 14768 | 50765 | ○ | 9.3 | Comparative steel |
| bi | 40 | 6 | 4 | 3 | 53 | 8 | 39 | 0 | 984 | 25 | 45 | 24600 | 44280 | ○ | 11.3 | Comparative steel |
| bj | 38 | 5 | 4 | 3 | 50 | 9 | 41 | 0 | 989 | 23 | 43 | 22747 | 42527 | ○ | 11.5 | Comparative steel |
| bk | 40 | 5 | 4 | 3 | 52 | 10 | 38 | 0 | 982 | 23 | 51 | 22586 | 50082 | ○ | 9.4 | Comparative steel |
| bl | 41 | 5 | 4 | 2 | 52 | 8 | 39 | 1 | 981 | 21 | 41 | 20601 | 40221 | ○ | 12.3 | Comparative steel |
| bm | 43 | 4 | 5 | 3 | 55 | 9 | 36 | 0 | 989 | 23 | 44 | 22747 | 43516 | ○ | 11.9 | Comparative steel |
| bn | 40 | 4 | 4 | 0 | 48 | 4 | 37 | 11 | 923 | 14 | 51 | 12922 | 47073 | × | 13.9 | Comparative steel |
| bo | 38 | 5 | 0 | 0 | 43 | 0 | 39 | 18 | 886 | 18 | 39 | 15948 | 34554 | × | 16.3 | Comparative steel |
| bp | 8 | 52 | 0 | 0 | 60 | 0 | 40 | 0 | 1033 | 11 | 23 | 11363 | 23759 | × | 10.7 | Comparative steel |
| bq | 7 | 55 | 0 | 0 | 62 | 2 | 36 | 0 | 1078 | 9 | 32 | 9702 | 34496 | × | 10.2 | Comparative steel |
| br | 33 | 5 | 0 | 0 | 38 | 0 | 39 | 23 | 834 | 17 | 42 | 14178 | 35028 | ○ | 9.9 | Comparative steel |
| bs | 22 | 0 | 0 | 0 | 22 | 0 | 46 | 32 | 753 | 16 | 46 | 12048 | 34638 | ○ | 10.6 | Comparative steel |
| bt | 29 | 10 | 7 | 6 | 52 | 9 | 39 | 0 | 1001 | 22 | 65 | 22022 | 65065 | ○ | 12.8 | Present invention steel |
| c | 53 | 6 | 3 | 3 | 65 | 11 | 24 | 0 | 1108 | 21 | 49 | 23268 | 54292 | ○ | 11.6 | Present invention steel |
| d | 55 | 8 | 4 | 0 | 67 | 10 | 23 | 0 | 1239 | 20 | 45 | 24780 | 55755 | ○ | 12.4 | Present invention steel |
| e | 48 | 8 | 7 | 3 | 66 | 13 | 21 | 0 | 1249 | 16 | 30 | 19984 | 37470 | ○ | 8.7 | Present invention steel |
| fa | 45 | 11 | 11 | 9 | 76 | 14 | 10 | 0 | 1280 | 16 | 32 | 20480 | 40960 | ○ | 7.9 | Present invention steel |
| fb | 0 | 0 | 0 | 0 | 0 | 0 | 100 | 0 | 712 | 20 | 72 | 14240 | 51264 | × | 8.6 | Comparative steel |
| fc | 28 | 0 | 0 | 0 | 28 | 0 | 54 | 18 | 775 | 19 | 42 | 14725 | 32550 | × | 8.8 | Comparative steel |
| fd | 24 | 0 | 0 | 0 | 24 | 0 | 49 | 27 | 793 | 17 | 38 | 13481 | 30134 | × | 8.3 | Comparative steel |
| fe | 42 | 0 | 0 | 0 | 42 | 0 | 33 | 25 | 843 | 15 | 32 | 12645 | 26976 | ○ | 9.5 | Comparative steel |
| ff | 10 | 65 | 3 | 0 | 78 | 4 | 18 | 0 | 1298 | 9 | 24 | 11682 | 31152 | ○ | 9.7 | Comparative steel |
| fg | 47 | 11 | 0 | 0 | 58 | 23 | 19 | 0 | 1345 | 15 | 14 | 20175 | 18830 | × | 8.9 | Comparative steel |
| fh | 45 | 11 | 27 | 0 | 83 | 2 | 15 | 0 | 1019 | 8 | 40 | 8152 | 40760 | × | 11.3 | Comparative steel |
| fi | 42 | 12 | 9 | 6 | 69 | 12 | 19 | 0 | 1216 | 15 | 35 | 18240 | 42560 | × | 12.1 | Comparative steel |
| fj | 43 | 11 | 9 | 6 | 69 | 13 | 18 | 0 | 1224 | 14 | 40 | 17136 | 48960 | × | 11.4 | Comparative steel |
| fk | 44 | 11 | 10 | 0 | 65 | 14 | 13 | 0 | 1265 | 13 | 33 | 16445 | 41745 | × | 10.9 | Comparative steel |
| fl | 41 | 12 | 11 | 6 | 70 | 14 | 16 | 0 | 1274 | 16 | 34 | 20384 | 43316 | ○ | 9.6 | Comparative steel |
| fm | 42 | 12 | 12 | 5 | 71 | 12 | 17 | 0 | 1293 | 15 | 38 | 19395 | 49134 | ○ | 9.7 | Comparative steel |
| fn | 41 | 13 | 8 | 6 | 68 | 0 | 16 | 16 | 805 | 18 | 41 | 14490 | 33005 | ○ | 14.7 | Comparative steel |
| fo | 41 | 11 | 0 | 0 | 52 | 0 | 16 | 32 | 785 | 19 | 42 | 14915 | 32970 | ○ | 17.2 | Comparative steel |
| fp | 11 | 58 | 0 | 0 | 69 | 3 | 28 | 0 | 1352 | 7 | 9 | 9464 | 12168 | ○ | 9.2 | Comparative steel |
| fq | 9 | 60 | 0 | 0 | 69 | 1 | 30 | 0 | 1397 | 6 | 4 | 8382 | 5588 | ○ | 9.6 | Comparative steel |
| fr | 28 | 0 | 0 | 0 | 39 | 0 | 38 | 23 | 821 | 17 | 30 | 13957 | 24630 | ○ | 9.9 | Comparative steel |
| fs | 28 | 0 | 0 | 0 | 28 | 0 | 40 | 32 | 782 | 18 | 24 | 14076 | 18768 | ○ | 9.6 | Comparative steel |
| g | 49 | 11 | 6 | 0 | 66 | 12 | 22 | 0 | 1021 | 24 | 51 | 24504 | 52071 | ○ | 2.8 | Present invention steel |
| ha | 52 | 13 | 10 | 7 | 82 | 18 | 0 | 0 | 1450 | 14 | 31 | 20300 | 44950 | ○ | 2.7 | Present invention steel |
| hb | 0 | 0 | 0 | 0 | 0 | 0 | 100 | 0 | 759 | 20 | 59 | 15180 | 44781 | ○ | 9.6 | Comparative steel |
| hc | 26 | 0 | 0 | 0 | 26 | 0 | 37 | 37 | 824 | 18 | 37 | 14832 | 30488 | ○ | 10.2 | Comparative steel |

TABLE 4-continued

| Experiment No. | Bainite [%] | Martensite ① [%] | Martensite ② [%] | Martensite ③ [%] | Bainite + Martensite [%] | Residual austenite [%] | Ferrite [%] | Pearlite [%] | TS [MPa] | EL [%] | λ [%] | TS × EL | TS × λ | Galvanized external appearance | Alloying Fe [%] | Note |
|---|---|---|---|---|---|---|---|---|---|---|---|---|---|---|---|---|
| hd | 19 | 0 | 0 | 0 | 19 | 0 | 34 | 47 | 793 | 16 | 32 | 12688 | 25376 | ○ | 10.5 | Comparative steel |
| he | 37 | 0 | 0 | 0 | 37 | 0 | 32 | 31 | 857 | 13 | 30 | 11141 | 25710 | ○ | 10.9 | Comparative steel |
| hf | 0 | 55 | 12 | 0 | 67 | 15 | 18 | 0 | 1652 | 4 | 7 | 6608 | 11564 | ○ | 9.9 | Comparative steel |
| hg | 34 | 15 | 0 | 0 | 49 | 29 | 22 | 0 | 1523 | 13 | 7 | 19799 | 10661 | ○ | 9.8 | Comparative steel |
| hh | 52 | 14 | 29 | 0 | 95 | 5 | 0 | 0 | 1221 | 10 | 36 | 12210 | 43956 | × | 10.2 | Comparative steel |
| hi | 54 | 11 | 9 | 8 | 82 | 18 | 0 | 0 | 1434 | 13 | 32 | 18642 | 45888 | × | 11.4 | Comparative steel |
| hj | 42 | 11 | 8 | 6 | 67 | 15 | 18 | 0 | 1426 | 13 | 33 | 18538 | 47058 | × | 10.7 | Comparative steel |
| hk | 53 | 13 | 11 | 8 | 85 | 15 | 0 | 0 | 1462 | 14 | 34 | 20468 | 49708 | × | 10 | Comparative steel |
| hl | 52 | 12 | 10 | 8 | 82 | 18 | 0 | 0 | 1489 | 14 | 31 | 20846 | 46159 | ○ | 8.6 | Comparative steel |
| hm | 55 | 14 | 10 | 6 | 85 | 15 | 0 | 0 | 1482 | 13 | 38 | 19266 | 56316 | ○ | 8.1 | Comparative steel |
| hn | 62 | 13 | 11 | 9 | 95 | 5 | 0 | 0 | 1162 | 11 | 29 | 12782 | 33698 | ○ | 13.8 | Comparative steel |
| ho | 52 | 24 | 0 | 0 | 76 | 5 | 0 | 24 | 1125 | 7 | 32 | 7875 | 36000 | ○ | 16.8 | Comparative steel |
| hp | 12 | 61 | 0 | 0 | 73 | 3 | 24 | 0 | 1589 | 6 | 4 | 9534 | 6356 | ○ | 10.1 | Comparative steel |
| hq | 13 | 60 | 0 | 0 | 73 | 0 | 27 | 0 | 1601 | 5 | 1 | 8005 | 1601 | ○ | 9.7 | Comparative steel |
| hr | 35 | 7 | 0 | 0 | 42 | 0 | 39 | 19 | 923 | 16 | 28 | 14768 | 25844 | ○ | 11.9 | Comparative steel |
| hs | 33 | 0 | 0 | 0 | 33 | 0 | 43 | 24 | 885 | 16 | 25 | 14160 | 22125 | ○ | 9.9 | Comparative steel |
| ht | 20 | 21 | 6 | 4 | 51 | 21 | 28 | 0 | 1356 | 15 | 35 | 20340 | 47460 | ○ | 10.3 | Present invention steel |
| i | 52 | 4 | 4 | 3 | 63 | 10 | 27 | 0 | 1185 | 17 | 45 | 20145 | 53325 | ○ | 10.4 | Present invention steel |
| j | 51 | 9 | 4 | 0 | 64 | 10 | 26 | 0 | 1205 | 16 | 46 | 19280 | 55430 | ○ | 11.6 | Present invention steel |
| k | 54 | 4 | 3 | 4 | 65 | 9 | 26 | 0 | 989 | 23 | 50 | 22747 | 49450 | ○ | 12.4 | Present invention steel |
| l | 50 | 8 | 4 | 4 | 66 | 8 | 26 | 0 | 1201 | 17 | 35 | 20417 | 42035 | ○ | 2.7 | Present invention steel |
| m | 55 | 5 | 3 | 4 | 67 | 9 | 24 | 0 | 1186 | 19 | 39 | 22534 | 46254 | ○ | 1.6 | Present invention steel |
| n | 44 | 8 | 6 | 5 | 63 | 10 | 27 | 0 | 1208 | 17 | 34 | 20536 | 41072 | ○ | 11.6 | Present invention steel |
| o | 51 | 6 | 7 | 7 | 71 | 9 | 20 | 0 | 1226 | 16 | 36 | 19616 | 44136 | ○ | 1.7 | Present invention steel |
| p | 0 | 63 | 22 | 0 | 85 | 15 | 0 | 0 | 1950 | 5 | 3 | 9750 | 5850 | ○ | 10.5 | Comparative steel |
| q | 16 | 5 | 5 | 3 | 29 | 10 | 61 | 0 | 945 | 18 | 26 | 17010 | 24570 | × | 6.8 | Comparative steel |
| r | 10 | 75 | 13 | 0 | 98 | 2 | 0 | 0 | 1523 | 9 | 29 | 13707 | 44167 | ○ | 8.9 | Comparative steel |
| v | 16 | 0 | 0 | 0 | 16 | 13 | 71 | 0 | 894 | 17 | 24 | 15198 | 21456 | ○ | 10.7 | Comparative steel |
| w | 92 | 8 | 0 | 0 | 100 | 0 | 0 | 0 | 927 | 11 | 62 | 10197 | 57474 | ○ | 12.5 | Comparative steel |
| x | 62 | 21 | 11 | 3 | 97 | 3 | 0 | 0 | 862 | 18 | 24 | 15516 | 20688 | ○ | 11.8 | Comparative steel |
| y | 5 | 0 | 0 | 0 | 5 | 0 | 95 | 0 | 1342 | 7 | 16 | 9394 | 21472 | ○ | 2.1 | Comparative steel |

Underlines indicate that a numeral value is out of the range of the present invention

INDUSTRIAL APPLICABILITY

The present invention provides the high-strength galvanized steel sheet having excellent formability with the ultimate tensile strength of 980 MPa or more, which is suitable for the structural member, the reinforcing member, and the suspension member of automobiles. Accordingly, the present invention can be expected to greatly contribute to the lighter-weight of automobiles and is extremely high in effect in industry.

The invention claimed is:

1. A high-strength alloyed hot-dip galvanized steel sheet having excellent plating adhesion, formability, and hole expandability with an ultimate tensile strength of 980 MPa or more, the alloyed hot-dip galvanized steel sheet comprising an alloyed hot-dip galvanized layer formed on a surface of a base steel sheet,
   wherein the base steel sheet contains: by mass %,
   C: 0.05% to 0.4%;
   Si: 0.01% to 3.0%;
   Mn: 0.1% to 3.0%;
   Al: 0.01 to 2.0%; in which Si+Al>0.5%
   P: limited to 0.04% or less;
   S: limited to 0.05% or less;
   N: limited to 0.01% or less; and
   a balance including Fe and inevitable impurities,
   a microstructure of the base steel sheet contains 40% or more by total volume fraction of martensite and bainite, 8% or more by volume fraction of residual austenite, and a balance of the microstructure being ferrite or ferrite and 10% or less by volume fraction of pearlite,
   the martensite contains 10% or more by total volume fraction of two or more kinds of martensites (1), (2), and (3) below, and
   the alloyed hot-dip galvanized layer contains 7 to 15 mass % of Fe,
   the martensite (1): C concentration (when there is a cementite precipitation, also including C in cementite); carbon concentration in the martensite (CM1) is less than 0.8 mass %, and nano-indentation test hardness Hit1 satisfies Expression 1:

$$Hit1/\{-982.1 \times (CM1)^2 + 1676 \times CM1 + 189\} \leq 0.50 \quad \text{Expression 1}$$

the martensite (2): C concentration (when there is a cementite precipitation, also including C in cementite); carbon concentration in the martensite (CM2) is 0.8 mass% or more, and nano-indentation test hardness Hit2 satisfies Expression 2:

$$Hit2/\{-982.1 \times (CM2)^2 + 1676 \times CM2 + 189\} \leq 0.50 \quad \text{Expression 2}$$

the martensite (3): C concentration (when there is a cementite precipitation, also including C in cementite); carbon concentration in the martensite (CM3) is 0.8 mass % or more, and nano-indentation test hardness Hit3 satisfies Expression 3:

$$0.5 < Hit3/\{-982.1 \times (CM3)^2 + 1676 \times CM3 + 189\} \leq 0.80 \quad \text{Expression 3.}$$

2. The high-strength alloyed hot-dip galvanized steel sheet having the excellent plating adhesion, formability, and hole expandability with the ultimate tensile strength of 980 MPa or more according to claim 1, wherein the base steel sheet further contains one or more of: by mass %,
   Cr: 0.05 to 1.0%;
   Mo: 0.05 to 1.0%;
   Ni: 0.05 to 1.0%; and
   Cu: 0.05 to 1.0%.

3. The high-strength alloyed hot-dip galvanized steel sheet having the excellent plating adhesion, formability, and hole expandability with the ultimate tensile strength of 980 MPa or more according to claim 1, wherein the base steel sheet further contains one or more of: by mass %,
   Nb: 0.005 to 0.3%;
   Ti: 0.005 to 0.3%; and
   V: 0.01 to 0.5%.

4. The high-strength alloyed hot-dip galvanized steel sheet having the excellent plating adhesion, formability, and hole expandability with the ultimate tensile strength of 980 MPa or more according to claim 1, wherein the base steel sheet further contains B: 0.0001 to 0.1% by mass %.

5. The high-strength alloyed hot-dip galvanized steel sheet having the excellent plating adhesion, formability, and hole expandability with the ultimate tensile strength of 980 MPa or more according to claim 1, wherein the base steel sheet further contains one or more of: by mass %,
   Ca: 0.0005 to 0.01%;
   Mg: 0.0005 to 0.01%; and
   REM: 0.0005 to 0.01%.

6. A manufacturing method of a high-strength alloyed hot-dip galvanized steel sheet having excellent plating adhesion, formability, and hole expandability with an ultimate tensile strength of 980 MPa or more, the manufacturing method comprising:
   with respect to a steel billet containing: by mass %,
   C: 0.05% to 0.4%;
   Si: 0.01% to 3.0%;
   Mn: 0.1% to 3.0%;
   Al: 0.01 to 2.0%; in which Si+Al>0.5%
   P: limited to 0.04% or less;
   S: limited to 0.05% or less;
   N: limited to 0.01% or less; and
   a balance including Fe and inevitable impurities,
   heating to 1200° C. or higher and performing hot rolling at an Ar3 transformation temperature or higher;
   performing cold rolling on a base steel sheet after the hot rolling at a reduction ratio of 40 to 70%;
   annealing the base steel sheet after the cold rolling at 730 to 900° C.;
   cooling the base steel sheet after the annealing to a temperature of 650 to 750° C. at an average cooling rate of 0.1 to 200° C/second, and cooling the base steel sheet to 450° C. or lower from the temperature of 650 to 750° C. at an average cooling rate of 20° C/second or faster;
   holding the base steel sheet cooled to the 450° C. or lower in a range of 350 to 450° C. for 120 seconds or longer;
   cooling the base steel sheet held in the range of 350 to 450° C. to 70° C. or lower at an average cooling rate of 5° C./second or faster;
   rolling the base steel sheet cooled to the room temperature at an elongation percentage of 0.2 to 2%;
   heating the rolled base steel sheet to "temperature of hot-dip galvanizing bath −40"° C. to "temperature of hot-dip galvanizing bath +50"° C. at an average temperature rising rate of 10° C./second or faster;
   dipping and hot-dip galvanizing the base steel sheet heated to the "temperature of hot-dip galvanizing bath −40"° C. to "temperature of hot-dip galvanizing bath +50"° C. into a hot-dip galvanizing bath and performing alloying-heating treatment at "temperature of hot-dip galvanizing bath −40"° C. or higher and 560° C. or lower within 40 seconds; and cooling the alloyed hot-dip galvanized steel sheet, which is subjected to the alloying-heating treatment, to 70° C. or lower at an average cooling rate of 5° C/second or faster.

7. The manufacturing method of the high-strength alloyed hot-dip galvanized steel sheet having the excellent plating adhesion, formability, and hole expandability with the ultimate tensile strength of 980 MPa or more according to claim 6, wherein a hot-dip galvanizing bath flows at a flow rate of 10 m/min or more and 50 m/min or less at the time of the hot-dip galvanizing.

8. The manufacturing method of the high-strength alloyed hot-dip galvanized steel sheet having the excellent plating adhesion, formability, and hole expandability with the ultimate tensile strength of 980 MPa or more according to claim 6, wherein before being heated to the "temperature of hot-dip galvanizing bath −40"° C. to "temperature of hot-dip galvanizing bath +50"° C., the base steel sheet is subjected to pickling, and then a surface of the base steel sheet is polished and removed to a depth of 0.1 µm or more and is pre-plated with 0.2 to 2 g/m² of Ni.

* * * * *